US012752194B2

(12) United States Patent
Xiong et al.

(10) Patent No.: US 12,752,194 B2
(45) Date of Patent: Oct. 6, 2026

(54) AUTOMATIC CREATION AND RECOMMENDATION OF VIDEO GAME FRAGMENTS

(71) Applicant: SONY INTERACTIVE ENTERTAINMENT LLC, San Mateo, CA (US)

(72) Inventors: True Xiong, San Mateo, CA (US); Charles McCoy, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 157 days.

(21) Appl. No.: 18/374,368

(22) Filed: Sep. 28, 2023

(65) Prior Publication Data

US 2025/0108306 A1 Apr. 3, 2025

(51) Int. Cl.

| | |
|---|---|
| ***A63F 13/67*** | (2014.01) |
| ***A63F 13/497*** | (2014.01) |
| ***A63F 13/5375*** | (2014.01) |
| ***A63F 13/63*** | (2014.01) |
| ***A63F 13/77*** | (2014.01) |
| ***A63F 13/86*** | (2014.01) |
| ***A63F 13/88*** | (2014.01) |

(52) U.S. Cl.

CPC ............ *A63F 13/67* (2014.09); *A63F 13/497* (2014.09); *A63F 13/5375* (2014.09); *A63F 13/63* (2014.09); *A63F 13/77* (2014.09); *A63F 13/86* (2014.09); *A63F 13/88* (2014.09)

(58) Field of Classification Search

CPC .... A63F 13/497; A63F 13/5375; A63F 13/63; A63F 13/67; A63F 13/77; A63F 13/86; A63F 13/88

See application file for complete search history.

(56) References Cited

U.S. PATENT DOCUMENTS

| | | | | |
|---|---|---|---|---|
| 8,672,765 | B2 * | 3/2014 | Gary | A63F 13/86 463/43 |
| 8,834,277 | B2 * | 9/2014 | Perry | A63F 13/12 463/43 |
| 9,352,226 | B2 * | 5/2016 | Miura | A63F 13/23 |
| 9,358,461 | B2 * | 6/2016 | Perry | A63F 13/63 |
| 9,364,743 | B2 * | 6/2016 | Miura | A63F 13/69 |
| 9,707,476 | B2 * | 7/2017 | Watson | A63F 13/88 |
| 10,258,881 | B2 * | 4/2019 | Perry | A63F 13/493 |
| 10,293,260 | B1 * | 5/2019 | Evans | A63F 13/424 |
| 10,300,394 | B1 * | 5/2019 | Evans | A63F 13/86 |

(Continued)

OTHER PUBLICATIONS

PCT Application No. PCT/US2024/025752, International Search Report and Written Opinion dated Aug. 2, 2024.

(Continued)

*Primary Examiner* — William H Mcculloch, Jr.

(74) *Attorney, Agent, or Firm* — Kilpatrick Townsend & Stockton LLP

(57) ABSTRACT

A computer-implemented method includes obtaining one or more preferences of a user for a video gaming session, identifying, using a trained machine learning model, a playable fragment of a video game based on a perceived match with the one or more preferences, recommending the playable fragment to the user, receiving fragment feedback from the user while or after the user plays the playable fragment, and updating the trained machine learning model based on the fragment feedback.

28 Claims, 12 Drawing Sheets

(56) References Cited

U.S. PATENT DOCUMENTS

| | | | | |
|---|---|---|---|---|
| 10,363,482 | B2 * | 7/2019 | Perry | A63F 13/355 |
| 10,406,429 | B2 * | 9/2019 | Zalewski | A63F 13/88 |
| 10,518,182 | B2 * | 12/2019 | Watson | A63F 13/88 |
| 10,525,359 | B2 * | 1/2020 | Watson | A63F 13/88 |
| 10,913,003 | B2 * | 2/2021 | Miura | H04N 21/4781 |
| 11,058,947 | B2 * | 7/2021 | Zalewski | A63F 13/88 |
| 11,318,391 | B2 * | 5/2022 | Nair | A63F 13/46 |
| 11,351,469 | B2 * | 6/2022 | Watson | A63F 13/45 |
| 11,406,906 | B2 * | 8/2022 | Miura | A63F 13/63 |
| 11,413,550 | B2 * | 8/2022 | Watson | A63F 13/88 |
| 11,565,176 | B2 * | 1/2023 | Perry | A63F 13/63 |
| 11,565,187 | B2 * | 1/2023 | Miura | H04N 21/4788 |
| 11,648,469 | B2 * | 5/2023 | Perry | A63F 13/5372 463/31 |
| 11,666,822 | B2 * | 6/2023 | Zalewski | A63F 13/497 463/24 |
| 11,806,631 | B2 * | 11/2023 | Nair | A63F 13/798 |
| 11,918,894 | B2 * | 3/2024 | Perry | A63F 13/355 |
| 11,938,399 | B2 * | 3/2024 | Perry | A63F 13/355 |
| 12,161,940 | B2 * | 12/2024 | Marr | A63F 13/497 |
| 2013/0244785 | A1 * | 9/2013 | Gary | A63F 13/79 463/43 |
| 2014/0066177 | A1 * | 3/2014 | Zalewski | A63F 13/60 463/24 |
| 2014/0094314 | A1 * | 4/2014 | Watson | A63F 13/70 463/42 |
| 2014/0179424 | A1 * | 6/2014 | Perry | A63F 13/60 463/31 |
| 2014/0179425 | A1 * | 6/2014 | Perry | A63F 13/63 463/31 |
| 2014/0179427 | A1 * | 6/2014 | Miura | A63F 13/69 463/31 |
| 2014/0179439 | A1 * | 6/2014 | Miura | A63F 13/53 463/42 |
| 2014/0187314 | A1 * | 7/2014 | Perry | A63F 13/30 463/29 |
| 2018/0357233 | A1 * | 12/2018 | Dazé | H04L 67/12 |
| 2019/0270020 | A1 * | 9/2019 | Miura | A63F 13/533 |
| 2020/0030702 | A1 * | 1/2020 | Benedetto | A63F 13/847 |
| 2020/0129856 | A1 | 4/2020 | Bond et al. | |
| 2021/0097584 | A1 | 4/2021 | Ranjan et al. | |
| 2023/0056715 | A1 | 2/2023 | Cote et al. | |
| 2023/0214706 | A1 | 7/2023 | Rossi | |
| 2023/0222537 | A1 | 7/2023 | Inamdar et al. | |
| 2025/0108304 | A1 * | 4/2025 | John | A63F 13/216 |
| 2025/0108305 | A1 * | 4/2025 | John | A63F 13/65 |
| 2025/0108306 | A1 * | 4/2025 | Xiong | A63F 13/86 |
| 2025/0128159 | A1 * | 4/2025 | McCoy | A63F 13/79 |

OTHER PUBLICATIONS

PCT/US2024/025752, True Xiong, Automatic Creation and Recommendation of Video Game Fragments, Apr. 23, 2024.

* cited by examiner

AUTOMATIC CREATION AND RECOMMENDATION OF VIDEO GAME FRAGMENTS

BACKGROUND

1. Field of the Disclosure

The present invention generally relates to video games. More specifically, the present invention relates to the automatic creation and recommendation of video game fragments or "minigames" using artificial intelligence (AI).

2. Description of the Related Art

In recent years, computer gaming has become a multi-billion-dollar business. However, competition for a user's time has never been fiercer. Some games require a time commitment that may exceed a user's availability in any given session. As a result, the user may avoid playing certain video games or even turn to a non-gaming activity, such as watching television, when it is perceived that there is insufficient time to play a lengthy video game.

SUMMARY

Embodiments of the present invention include systems and methods for using AI to create and recommend fragments of video games that align with a user's preferences including time availability. According to one aspect, a computer-implemented method includes obtaining one or more preferences of a user for a video gaming session. The one or more preferences, which can include time and/or goal preferences, can be explicit or implicit. The implicit user preferences can be based, for example, on user calendar data and/or user historical data.

The computer-implemented method also includes identifying, using a trained machine learning model, a playable fragment of a video game based on a perceived match with the one or more preferences. The computer-implemented method further includes recommending the playable fragment to the user.

In addition, the computer-implemented method includes receiving fragment feedback from the user while or after the user plays the playable fragment. The fragment feedback can include one or more of audible feedback, visual feedback, textual feedback, motion feedback, and vital signs feedback. The computer-implemented method also includes updating the trained machine learning model based on the fragment feedback.

In some examples, identifying a playable fragment includes generating the playable fragment from the video game. Generating the playable fragment can include recording gameplay of the video game including one or more of user input data and game state data generated by processing the user input data by a video game processor. Generating the playable feedback can also include analyzing, by a game state analyzer, the recorded gameplay to determine a region of interest based on at least one of user gameplay feedback or levels of activity of the user input data or the game state data. Generating the playable feedback can further include defining, by a break point processor, boundaries within a gameplay context of the video game based on the region of interest that define options for selection of a beginning and an end for the playable fragment. Additionally, generating the playable fragment can include generating, by a fragment generator, the playable fragment based on the selection defined from the boundaries.

DETAILED DESCRIPTION

The following embodiments describe methods and systems for creating and recommending video game fragments.

It will be understood, however, to one skilled in the art, that the present invention may be practiced without some or all of these specific details. In other instances, well known process operations have not been described in detail in order not to unnecessarily obscure the present invention.

Figure 1A:
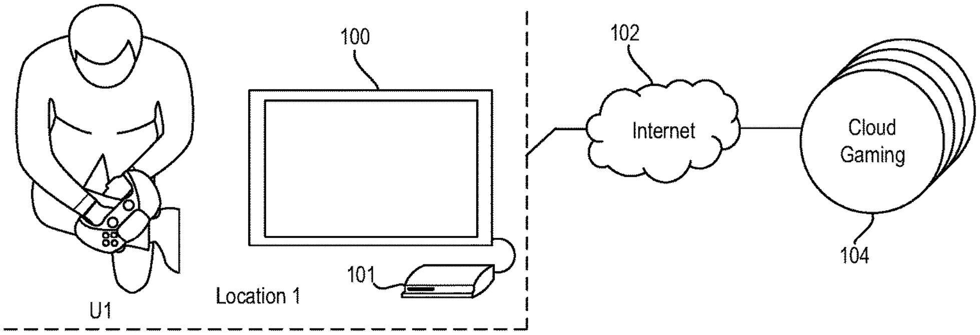
FIG. 1A illustrates a user playing a cloud-based video game.

FIG. 1A illustrates a user playing a cloud-based video game. As shown, a user U1 plays a cloud-based video game shown on a display 100. A cloud-based video game is a video game that is substantially executed on a remote server. A server, in one embodiment, can include individual servers or servers that are executed in a virtual machine data center, where many servers can be virtualized to provide the requested processing.

In the illustrated embodiment, cloud gaming server(s) 104 execute the video game that is rendered on the display 100. A client 101 is situated at the user's location to receive and process inputs and communicate these to the cloud gaming servers 104, and also to receive video and audio data from the cloud gaming servers 104. The client 101 and the cloud gaming servers 104 communicate over a network 102, such as the Internet. In other embodiments, the client can be any device, whether portable or not, whether wireless or not, so long as the client can communicate with a network and provide access to a display for rendering game play and enable input from a user to drive interactivity. In one embodiment, the client is a thin client. However, in other embodiments, the client can be a general purpose computer, a special purpose computer, a gaming console, a personal computer, a laptop computer, a tablet computer, a mobile computing device, a portable gaming device, a cellular phone, a set-top box, a streaming media interface/device, a smart television or networked display, a virtual reality (VR) or augmented reality (AR) system, or any other computing device capable of being configured to fulfill the functionality of a client as defined herein. In one embodiment, the cloud gaming server is configured to detect the type of client device, which is being utilized by the user, and provide a cloud-gaming experience appropriate to the user's client device. For example, image settings, audio settings and other types of settings may be optimized for the user's client device.

In various embodiments, the degree of processing performed by the client may vary with respect to input and output processing. However, in some cases, the video game state is substantially maintained and executed on the cloud gaming servers 104, with the client primarily functioning to receive and communicate user inputs, and receive video/audio data for rendering. The client 101 may be a standalone device that is connected to the display 100 and provides video data for rendering on the display 100. In other embodiments, the client can be integrated into the display 100. In one embodiment, the display 100 is a networked display providing a platform operating system for applications or "apps" utilizing the network connectivity of the display. In such an embodiment, the client can be defined by an application executed on the platform provided by the display's operating system.

Figure 1B:
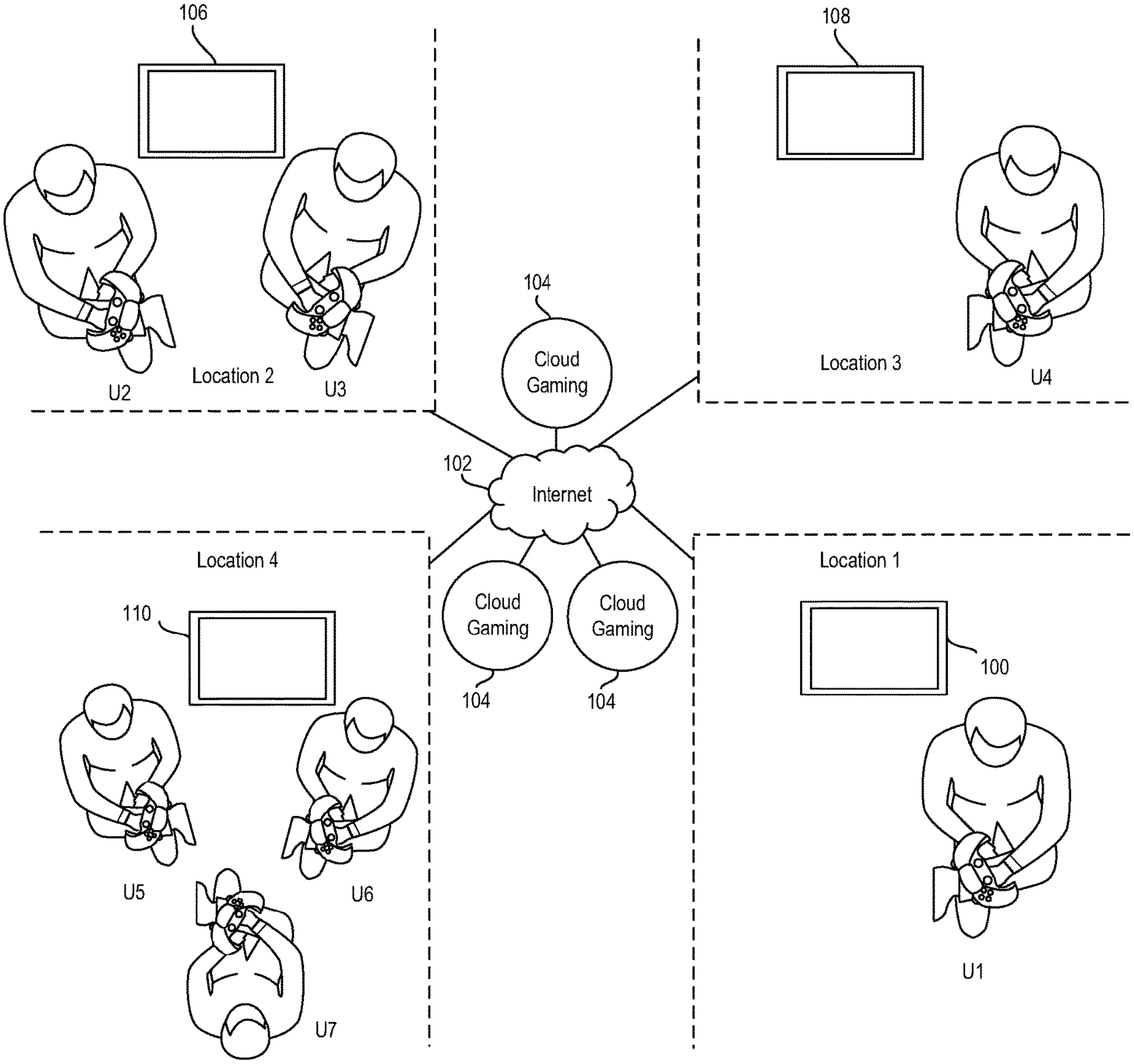
FIG. 1B illustrates multiple users in multiple locations engaged in gameplay of cloud-based video games.

FIG. 1B illustrates multiple users in multiple locations engaged in gameplay of cloud-based video games. The user U1 is shown at a first location interacting with a video game rendered on the display 100. Users U2 and U3 are shown at a second location interacting with a video game rendered on a display 106. A user U4 is shown at a third location playing a video game rendered on a display 108. Users U5, U6, and U7 are shown at a fourth location interacting with a video game rendered on a display 110.

At each of the first, second, third, and fourth locations, at least one computing device is provided for processing input from the various users and rendering a cloud-based video game on their respective displays. It should be appreciated that the computing device can be integrated into a display, or may be a standalone device such as a personal computer, set top box, gaming console, VR headset, or any other type of device having at least one processor and memory for processing and storing data. The computing device can execute or define a client, as has been described above. The computing devices are networked and communicate over the network 102 with cloud gaming servers 104. In some cases, a single computing device in a location can perform processing for more than one user. In other cases, each user in a location can have a computing device performing processing dedicated to that user, which may be combined with other computing devices at that location.

The cloud gaming servers 104 execute the various video games that are being played by the users, defining a given video game's game state from moment to moment, and sending video data (including image data and audio data) to a computing device at a particular location. The computing device at a given location processes input from the user(s) playing the video game, and transmits input data to the cloud gaming server, which in turn processes the input data to affect the game state of the video game. It should be appreciated that cloud-based gaming facilitates multi-player gaming from players located at different locations by providing for execution of the video game at a remote server that is accessible by all players over a network. In this manner, execution of the video game is not dependent on any single player's hardware or network conductivity, although such will affect the user experience for that given player.

Figure 2:
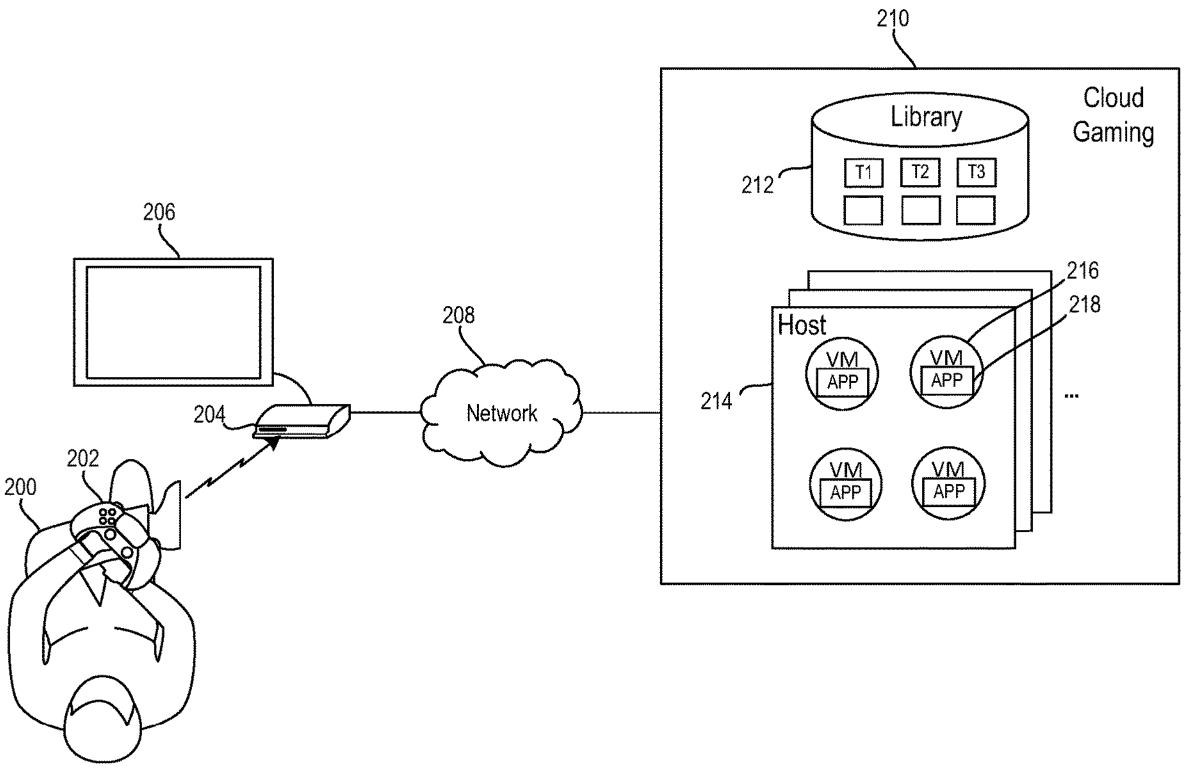
FIG. 2 illustrates a system for cloud gaming.

FIG. 2 illustrates a system for cloud gaming. As shown, a user 200 operates a controller 202 to provide input to a cloud-based video game. The controller 202 can include any of various kinds of input devices, such as buttons, joysticks, a touchpad, a trackball, a VR headset and/or VR controllers, as well as motion sensing hardware, such as accelerometers, magnetometers, and gyroscopes. In one embodiment, the controller 202 can include an illuminated object that can be tracked to determine the location of the controller 202. The controller 202 can communicate wirelessly with a thin game client 204. The client 204 communicates over a network 208 with a cloud gaming service 210. The client 204 processes data from the controller 202 to generate input data that is communicated to a video game executed by the cloud gaming service 210. Additionally, the client 204 receives video data from the cloud gaming service 210, for rendering on the display 206. In one embodiment, the client 204 may process the received video data to provide a video stream in a format compatible with the display 206. In one embodiment, the client 204 can include a camera for tracking a controller device or an object located on the controller device. As has been noted, the object can be illuminated to further facilitate tracking based on analysis of captured image frames from the camera.

The cloud gaming service 210 includes resources for providing an environment in which a video game can be executed. Broadly speaking, resources can include various kinds of computer server hardware, including processors, storage devices, and networking equipment, which can be utilized to facilitate execution of a video game application. In the illustrated embodiment, a video game library 212 includes various game titles. Each game title defines executable code as well as associated data and asset libraries which are utilized to instantiate a video game. The host 214 can be a single computing device that defines a platform for instantiating virtual machines 216. In another embodiment, the host 214 can itself be a virtualized resource platform. In other words, the host 214 may operate over one or more server computing devices, handling the allocation and usage of the resources defined by the server computing devices, while presenting a unified platform upon which virtual machines 216 can be instantiated.

Each virtual machine 216 defines a resource environment which can support an operating system, upon which a video game application 218 can be run. In one embodiment, a virtual machine can be configured to emulate the hardware resource environment of a gaming console, with an operating system associated with the gaming console being run on the virtual machine to support the running of game titles which were developed for that gaming console. In another embodiment, the operating system can be configured to emulate a native operating system environment of a gaming console, though the underlying virtual machine may or may not be configured to emulate the hardware of the gaming console. In another embodiment, an emulator application is run on top of the operating system of a virtual machine, the emulator being configured to emulate the native operating system environment of a gaming console to support video games designed for that gaming console. It should be appreciated that a variety of current and legacy gaming consoles can be emulated in a cloud-based gaming system. In this manner, a user can access game titles from different gaming consoles via the cloud-gaming system.

When the user 200 requests to play a specific video game title, the video game title is retrieved from the library 212. If a compatible virtual machine has not been already instantiated or is not available for use, then a new compatible virtual machine is instantiated on the host 214. In some cases, if a game has not been already instantiated or is not available for use, then a new game can be instantiated on a dedicated host for performance and security reasons. The retrieved video game title is then executed as an application 218 on the available or newly instantiated virtual machine 216. In one embodiment, this can entail determining the appropriate platform for the video game title (e.g., which gaming console or operating system the game requires to run) and assigning the video game title to an appropriate virtual machine for execution, e.g., one having an emulator application capable of handling execution of the video game title. The executing video game communicates with the game client 204 to provide an interactive gaming experience for the user 200. More specifically, the executing video game application 218 receives input data from the client 204 over the network 208. The application 218 processes the input data to update the game state of the executing application. As the game state changes, the application 218 outputs video data that is sent to the client 204 for rendering on the display 206. Additionally, the application 218 may also output feedback data to the client 204 that is utilized to provide an additional feedback mechanism to the user. By way of example, the user's controller 202 may include a tactile vibration feedback mechanism that can be activated based on the output feedback data from the video game application.

In one embodiment, the cloud gaming system is configured to detect the type of client device associated with the user, and also a type of controller available for the user to provide input to the cloud-based video game. For example, in one embodiment, when a user logs in to the cloud gaming system, they may be presented with an option to designate the type of client device with which they are accessing the cloud gaming system. In one embodiment, a series of client device options are presented from which the user may select one corresponding to their client device. The user may also be presented with an option to designate the type of controller device they will use to play a video game. In one embodiment, a series of controller options can be presented to the user, from which the user may select to designate a controller type corresponding to their controller hardware. In other embodiments, the cloud gaming system can be configured to automatically detect the client device type and/or the controller device type.

For example, at the time of login, the client device may send information to the cloud gaming server identifying itself as well as a connected controller device (e.g., in response to a request from the cloud gaming server). Based on this information, the cloud gaming server may determine an appropriate video game output configuration and input parameter configuration to provide a gaming experience optimized for the user's client device and controller device. In one embodiment, a look-up table is employed to determine video game configuration and input parameter configuration based on a detected client device and a detected controller device.

It should be appreciated that a given video game may be developed for a specific platform and a specific associated controller device. However, when such a game is made available via a cloud gaming system as presented herein, the user may be accessing the video game with a different controller device. For example, a game might have been developed for a game console and its associated controller, whereas the user might be accessing a cloud-based version of the game from a personal computer utilizing a keyboard and mouse or a VR headset and associated VR controllers. In such a scenario, the input parameter configuration can define a mapping from inputs which can be generated by the user's available controller device to inputs which are acceptable for the execution of the video game. In some cases, a service may utilize local hardware instead of, or in addition to, running the game on a cloud gaming server 104. In some cases, a cloud gaming server 104 may coordinate between multiple local hardware devices that are running code for the same gaming session.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlayed during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud gaming server via a network (e.g., accessed via a local networking device such as a router). However, in other embodiments, the controller can itself be a networked device, with the ability to communicate inputs directly via the network to the cloud gaming server, without being required to communicate such inputs through the client device first. For example, the controller might connect to a local networking device (such as the aforementioned router) to send to and receive data from the cloud gaming server. Thus, while the client device may still be required to receive video output from the cloud-based video game and render it on a local display, input latency can be reduced by allowing the controller to send inputs directly over the network to the cloud gaming server, bypassing the client device.

In one embodiment, a networked controller and client device can be configured to send certain types of inputs directly from the controller to the cloud gaming server, and other types of inputs via the client device. For example, inputs whose detection does not depend on any additional hardware or processing apart from the controller itself can be sent directly from the controller to the cloud gaming server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud gaming server. These might include captured video or audio from the game environment that may be processed by the client device before sending to the cloud gaming server. Additionally, inputs from motion detection hardware of the controller might be processed by the client device in conjunction with captured video to detect the position and motion of the controller, which would subsequently be communicated by the client device to the cloud gaming server. It should be appreciated that the controller device in accordance with various embodiments may also receive data (e.g., feedback data) from the client device or directly from the cloud gaming server. In some cases, data from input devices can be processed by a local computing device, which can then provide the results of that processing instead of, or in addition to, all or part of the raw data. Transmitting the result of processing can significantly reduce the bandwidth of data that needs to be transmitted. For example, eye tracking sensor data can be processed to determine the results of that processing, such as focus point on the display, displayed object focused on, blinking, eye opening amount, rate of eye movements, and/or determined emotions. As another example, data from a video camera can be analyzed to identify gestures made by the user. The identified gestures can be transmitted to the cloud while access to the raw data from the video camera can be limited to just the local computing device. In some cases, transmitting the result of processing raw data from user input devices instead of the raw data can result in better privacy for the user.

Figure 3:
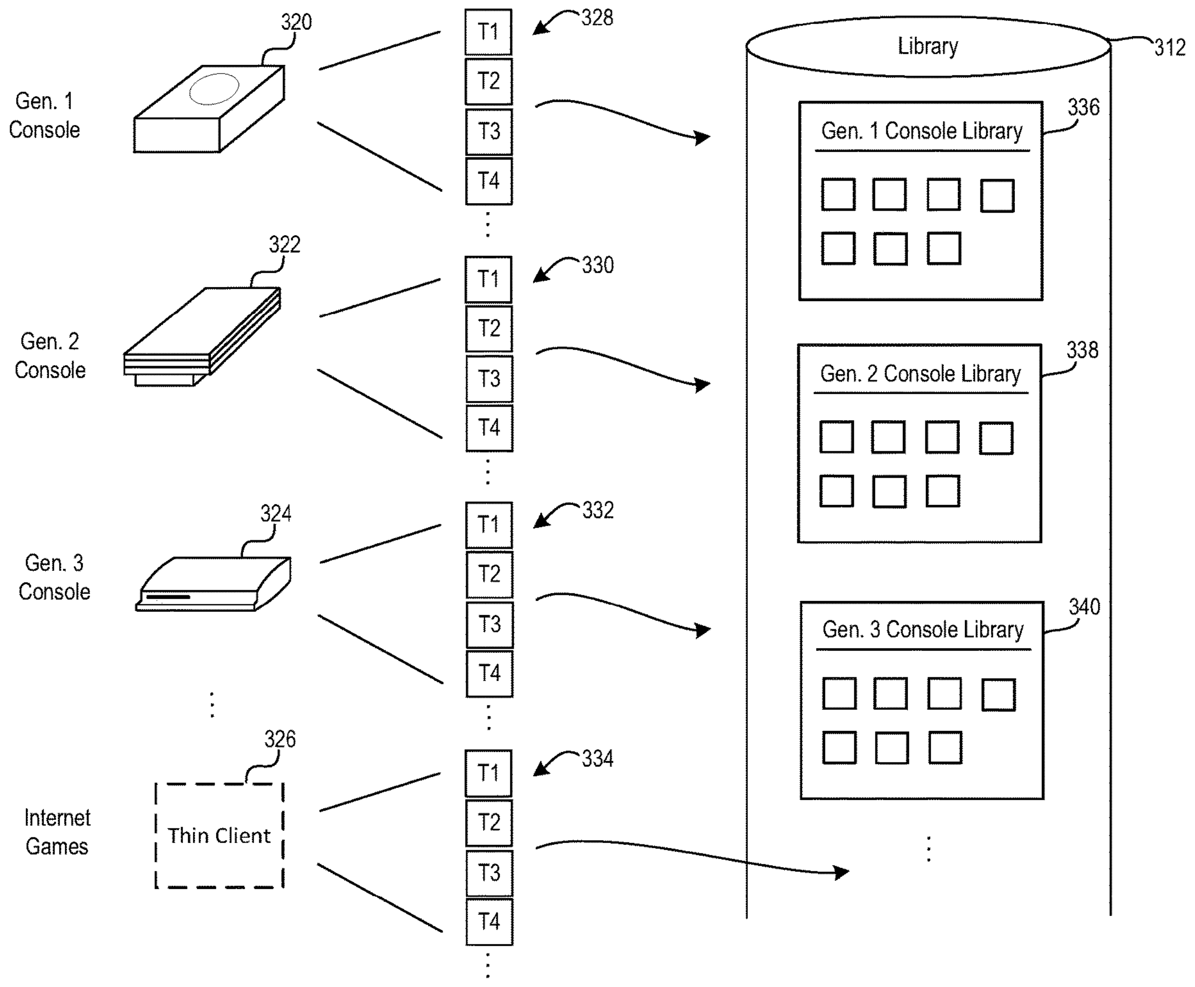
FIG. 3 illustrates the accumulation of game titles across various generations of gaming consoles.

FIG. 3 illustrates the accumulation of game titles across various generations of gaming consoles. In the video gaming industry, video games are developed for specific video game consoles. Over time a library of game titles is amassed for a specific game console. For example, in the illustrated diagram, a first generation console 320 has a collection of game titles 328 which have been developed for it. A second-generation console 322 has associated there with a collection of game titles 330 which have been developed for it. And a third-generation console 324 is also shown, having a collection of game titles 332 developed for it. In other embodiments, there may be a collection of game titles 334 which have been specifically developed as cloud-based games for use in conjunction with a client 326. Furthermore, other types of games such as Internet games can be developed and collected for distribution over a cloud gaming system, as is described herein. It will be appreciated that game titles from different generations of game consoles can be collected and consolidated in the cloud gaming library 312. As shown, the library 312 includes a first generation console library 336 which includes the game titles which have been developed for the first generation console 320. In a similar manner, the library 312 also includes a second-generation console library 338 and a third generation console library 340 which contain video games that have been developed for the second and third generation consoles, respectively. Games which have been developed for the client 326 and other types of games such as Internet games can also be included in the game library 312. As can be seen, many game titles from across various generations of video gaming consoles can be amassed and made available via a cloud gaming library. As has been described, each of these games can be executed on a virtual machine that simulates the operating system environment associated with a given gaming console for which a game was developed. In this manner, users accessing the cloud-based gaming system can easily access and play games from across many different consoles as well as games from other contacts such as Internet games and games which have been specifically developed for use with the cloud-based gaming system. Some console generations may have the capability to play games that were created for another console generation or another gaming system. Some game titles may be targeted to be playable on multiple console generations or multiple gaming systems. Some game titles that are not owned by the player may be temporarily available for the player to play, such as through a subscription, demo, or limited use game fragment.

Figure 4A:
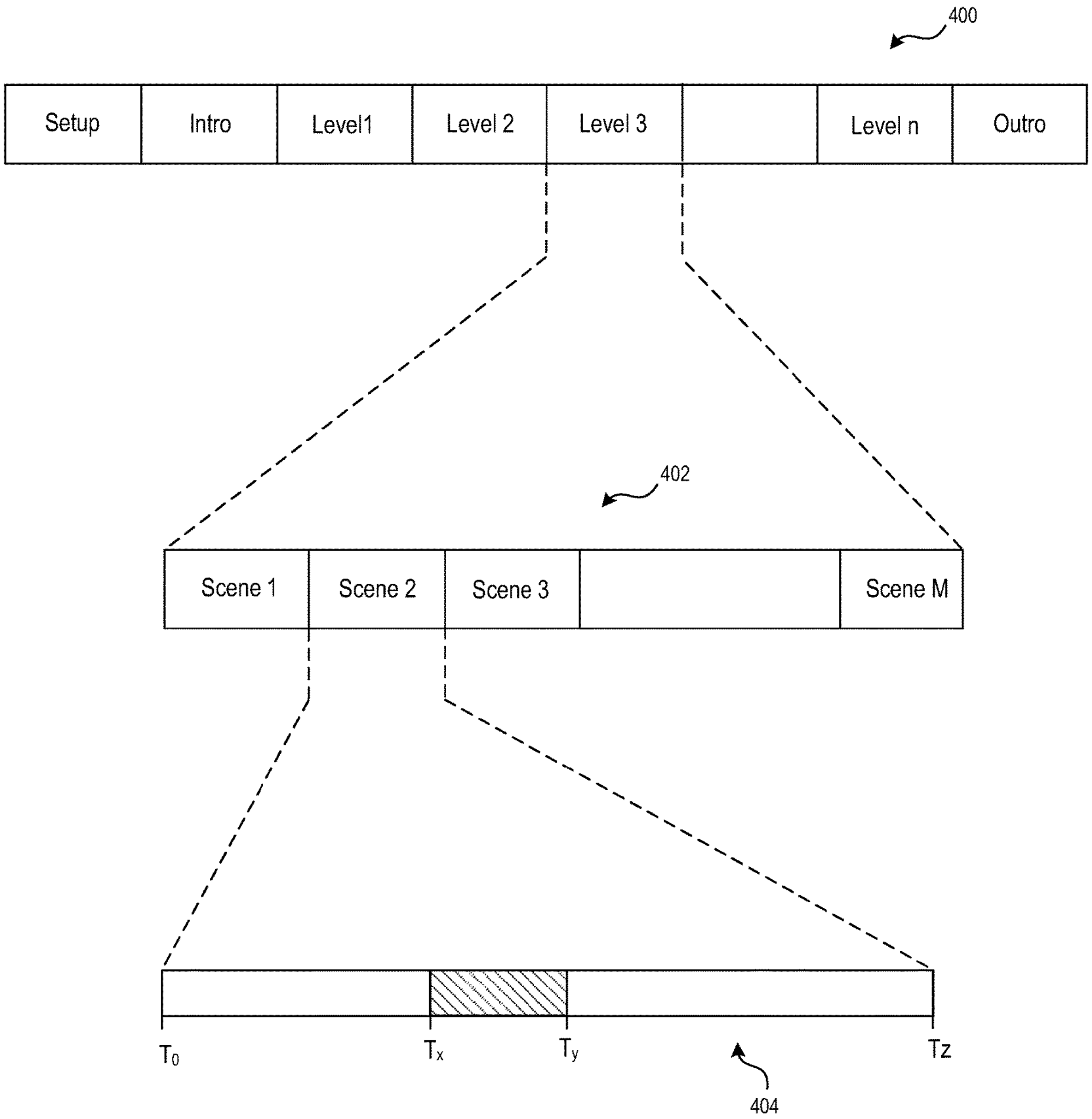
FIG. 4A illustrates the hierarchical organization of various portions of a video game.

FIG. 4A illustrates the hierarchical organization of various portions of a video game. By way of example, a video game can be organized into various sections 400. In the illustrated embodiment, these may include a set up section, an introduction section, various level sections, and an outro section. A given level may be further divided into various scenes. As shown, the level 3 section is broken down into various scenes 402. In some cases, a game level may be hierarchical, containing other game areas. For example, a game level may contain a continent, which may contain a town, which may contain a magic shop, where each of those nested game levels may contain scenes. As the user plays through a given scene, a gameplay timeline of that scene can be recorded, including recorded video of the user's gameplay as well as recorded input data and game states (e.g., variables) of the executed game application. In the illustrated embodiment, the gameplay timeline 404 is representative of the user's gameplay of scene 2 of level 3 of the game. In some cases, the game play opportunities available to play are different in different game areas, levels, times, or other game fragments, such as puzzles, combat challenges, or crafting. The game play opportunities available may differ based on the game state when playing the particular portion of the game, such as the chosen character class, guild membership, previous NPC interactions, items equipped, the character's inventory, or skills learned by the character. In some cases, game fragments can be identified based on activities preferred by a player and what game fragments and game states provide those activities.

In one embodiment, a user may select portions of their recorded gameplay from which to generate a minigame or game fragment. For example, in the illustrated embodiment, the gameplay timeline 404 has a start time $T_0$ and an ending time $T_z$. A portion of the gameplay timeline from a time $T_x$ to a time $T_y$ has been selected from which to generate a minigame. In some cases, games provide the player with a choice of activities to do or areas to explore. In such a case, scenes 402 and/or portions of the gameplay timeline 404 can be identified and used to create one or more playable game fragment that will provide the player with the game play activities and/or areas they are likely to enjoy.

In other embodiments, as described with reference to FIG. 7A-B, game fragments can be automatically generated using machine learning based on the gameplay of various past users and offered to a particular user in accordance with explicit or implicit preferences about that user's time availability, skills, and interests.

Figure 4B:
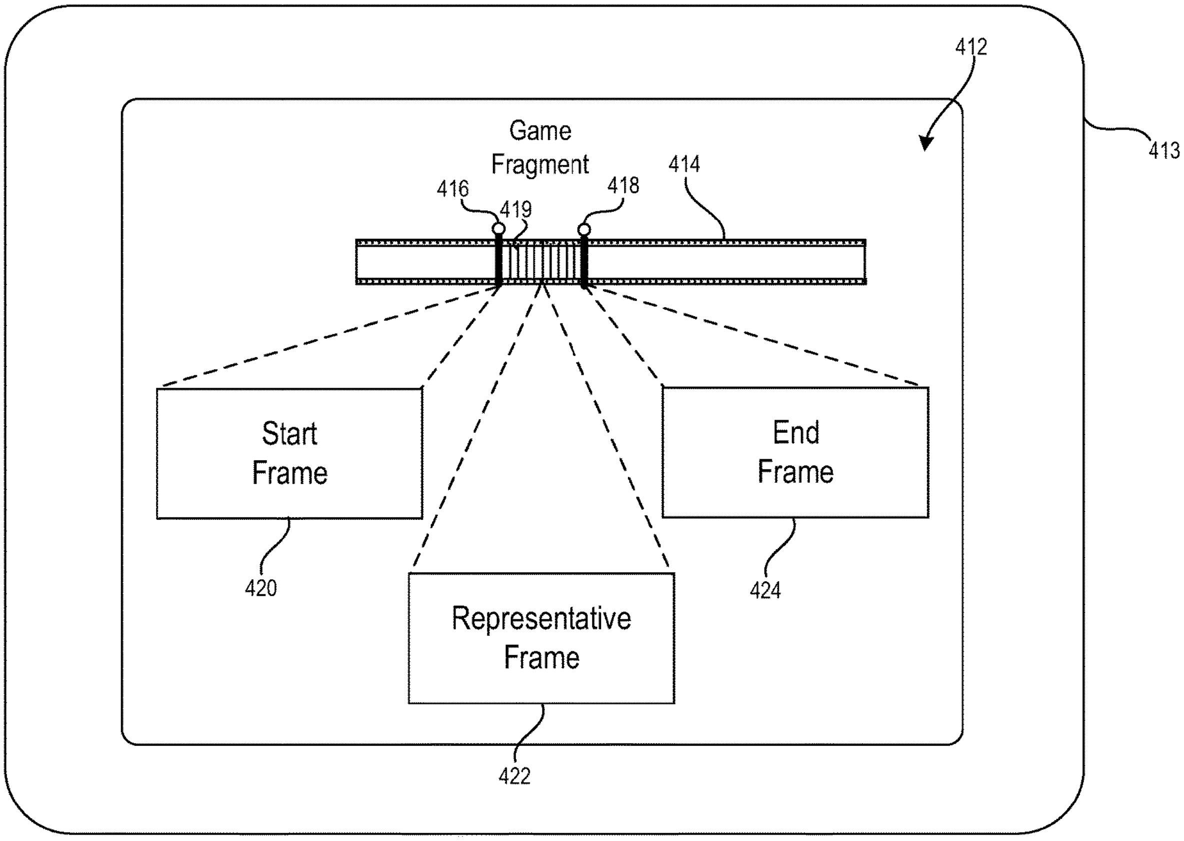
FIG. 4B illustrates an interface for selecting a portion of a gameplay timeline for generation of a game fragment or minigame.

FIG. 4B illustrates an interface for selecting a portion of a gameplay timeline by a user for generation of a minigame or game fragment. In the illustrated embodiment, the interface 412 is presented on a touchscreen of a device 413, such as a tablet computing device. The interface 412 includes a selectable gameplay timeline 414. The gameplay timeline 414 is represented as a film strip with adjustable markers 416 and 418. The marker 416 designates the start point along the gameplay timeline 414 of the selection, whereas the marker 418 designates the endpoint along the gameplay timeline of the selection. Furthermore, a marker 419 can be positioned within the portion of the gameplay timeline 414 that has been founded by the start marker 416 and the end marker 418. For ease of use and to provide the user with a visual understanding of what portion of their gameplay is being selected, a start frame 420 can be shown corresponding to the point along the gameplay timeline at which the marker 416 has been positioned. The start frame 420 is an image of the recorded gameplay video corresponding to the time at which the start marker 416 is positioned. Likewise, a representative frame 422 is an image of the recorded gameplay video corresponding to the time at which the marker 419 is positioned. In a similar manner, the end frame 424 is an image of the recorded gameplay video corresponding to the time at which the end marker 418 is positioned. The representative frame 422 can be utilized as a representative image for the game fragment that is created based on the selected portion of the gameplay timeline 414. Although a touch-screen interface is provided and described, in other embodiments, various other kinds of input can be utilized to select starting and ending points to define a portion of gameplay for creation of a game fragment. For example, input can be provided via a game controller, a keyboard, VR controller, gesture input, voice input, and in accordance with other types of input devices and mechanisms to enable selection of a portion of gameplay along with selection of a representative image frame from the recorded gameplay video.

In some embodiments the selection markers may not be continuously adjustable along the gameplay timeline but may be configured instead to snap to pre-defined time points along the gameplay timeline. For example, predefined time points may be defined to correspond with specific events occurring in the gameplay timeline. The specific events of a given gameplay timeline for which predefined time points will be assigned can be generated based on analysis of the users gameplay and will depend on the specific architecture of the video game gameplay. In one embodiment, predefined time points can be assigned based on geographical location of a character within a virtual world defined by the video game. For example, predefined time points can be assigned to the specific times at which a character moved from one geographical locale to another geographical locale, e.g., movement from one scene location to another scene location, movement from one city to another city, entering a structure, entering a room within a structure, entering the vehicle, entering a different type of environment, or any other kind of geographical transition of significance. In another embodiment, predefined time points can be assigned based on development of a user's character or entity which is controlled in the video game. For example, predefined time points can be assigned when a character or entity controlled by the user accomplishes a task, acquires a skill, acquires an object, passes a level or otherwise completes a portion of the video game, or performs or achieves any other kind of significant activity in the video game. In some cases, a playable game fragment may begin when an event in-game is triggered, such as the appearance of a boss monster, the player triggering a trap, or an earthquake occurring.

Figure 5:
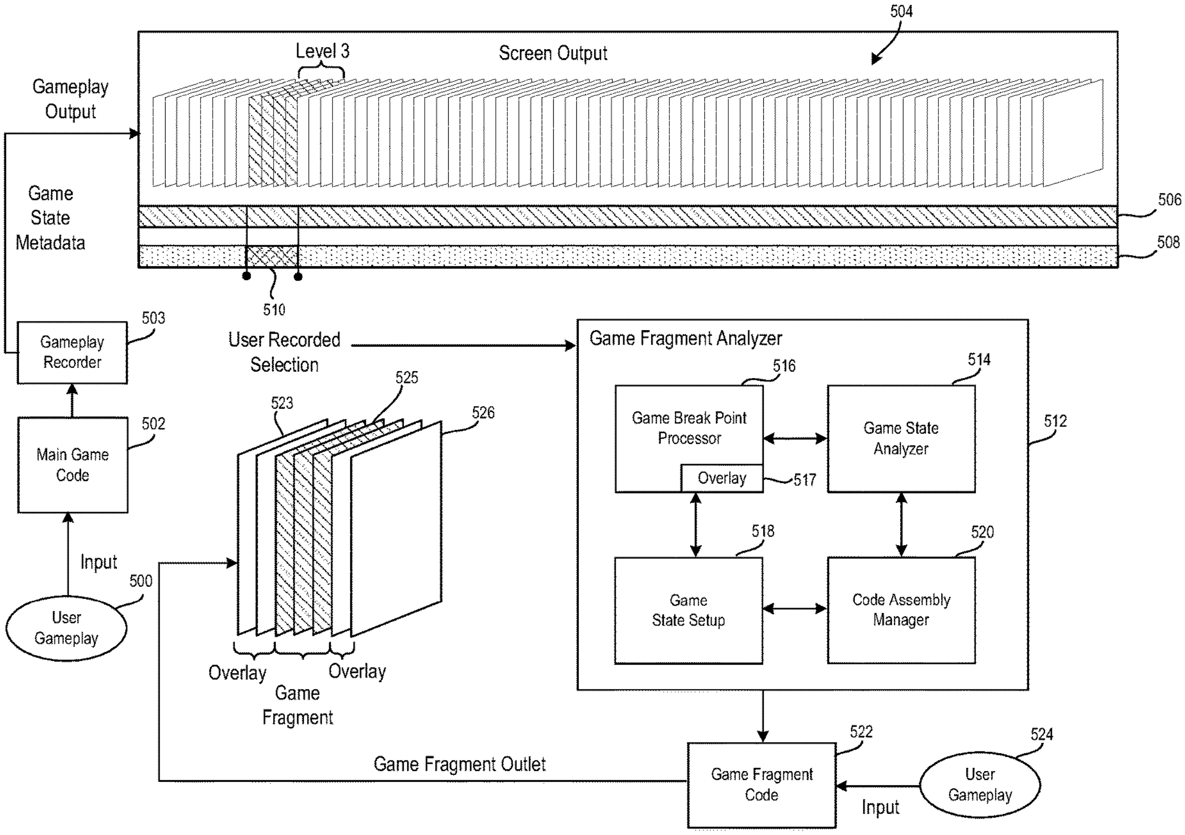
FIG. 5 illustrates a system for generating game fragment code for a playable minigame.

After a user has selected a portion of gameplay from which to create a game fragment, a playable minigame based on the selected portion of gameplay may be created, as described in further detail with respect to FIG. 5. More specifically, the game fragment enables the user or another user to replay or play substantially the same portion of the video game later, and possibly under substantially the same conditions and parameters. In this sense, the game fragment is more than simply a replay video of the original user's gameplay, but is a playable portion of the video game, itself. A subsequent user may thus experience a substantially similar gameplay experience to that of the original user without having to play through the video game in a linear fashion. In some cases, a subsequent user may experience a similar gameplay experience to that of the subsequent users in a non-linear fashion; the user may replay or play a game fragment from any of the predecessor or subsequent users.

FIG. 5 illustrates a system for generating game fragment code. The terms game fragment and minigame are used interchangeably herein to define a discreet and playable portion of a video game that is generated from existing recorded gameplay. In the illustrated embodiment, the user gameplay 500 conceptually represents a user interacting with a full version of a video game. The user could be a human player or, in some embodiments, an AI player that plays the video game in a sequential fashion from the beginning.

Main game code 502 is executed to define the full version of the video game. As the video game is played, it generates various types of gameplay output, including video data, game state data, and user input data. These can be recorded by a gameplay recorder 503 to define the user's recorded gameplay. In the illustrated embodiment, an image stream 504 conceptually represents the video data output by the video game. Game state data 506 and user input data 508 are also shown. The game state data 506 includes data defining the game state of the executing video game from moment to moment during gameplay. In some cases, the game state data can allow starting game play for a game fragment at a finer level of specificity than pre-defined starting points, up to being able to choose any frame of the recording in which to start playback. The game play can begin using the same game state that existed during the recorded game play or may be modified in the generation of a game fragment. In some cases, game state data from locations other than the starting point for a game fragment can be included in the game fragment to provide game play of the game fragment that more closely matches the game play in the recording. For example, if the player opens a chest in the selected portion of the recording and the chest contains items randomly determined by the game when the chest is opened, that random determination can be included in the game state and used in the game fragment. In other words, if the player opens the same chest during play of the game fragment, the items chosen to be in the chest when they open it will be the same items that were chosen during the recorded game play.

The user input data is data generated by capturing user initiated actions occurring during interactivity with the video game, such as may be provided via activation of input devices on controller devices, detection of sensor data (e.g., motion sensors), captured audio input, and the like. In some cases, the user input data may contain data from user interactions with things other than the video game, such as the user's interactions with a different game title or preferences the user specifies in a game system user interface.

Game state data can include the values of any variables which define the execution state of the video game. For example, the game state data may include position variables indicating the X, Y, and Z positions of an object in a virtual space of a video game such as a character or a vehicle. Camera angle variables indicate the direction of a virtual camera or virtual view in the video game. In one embodiment, the camera angle is defined by an azimuth component measured (e.g., along a horizontal plane) relative to and azimuth reference and an inclination component measured relative to an inclination reference (e.g., relative to vertical). Action variables indicate the initiation and sustaining of various actions within the video game. It should be appreciated that actions for a given video game will be specific to the context of the video game. By way of example, actions could include the initiation of specific maneuvers, the application of skills, the triggering of modification mechanisms that modify an existing action such as increasing its level of intensity or frequency, etc., or any other type of action or activity that can be triggered by user input during the course of the video game. A weapon variable indicates the triggering of a weapon the video game. A health variable indicates a level of health of, for example, a user's character in the video game. Button variables indicate the state of buttons on a controller device, e.g., whether the button is in a depressed state or in a released statement. Joystick state variables in the illustrated embodiment indicate a magnitude of movement of a joystick relative to a neutral position. The foregoing game state variables are merely exemplary, and it will be recognized by those skilled in the art that many other types of game state variables can be tracked over time As has been described, a user interface can graphically depict the user's recorded gameplay to facilitate selection by the user of a portion of the user's gameplay from which to generate a game fragment. In the illustrated embodiment, the user has defined a selection from their recorded gameplay representing a game fragment 510. This selection of the user's recorded gameplay is utilized by a game fragment generator to generate game fragment code 522 which defines a limited game based on the selected portion of the user's gameplay. The game fragment generator 512 includes a game state analyzer 514, which analyzes the game state of the game fragment 510. Based on the analysis of the game state of the recorded selection, a game breakpoint processor 516 determines appropriate breakpoints to define the beginning and ending of the game fragment. Breakpoints can be defined based on geography, time, task or goal accomplishment, scene boundaries (physical or temporal), or any other aspect of a video game according to which the video game's gameplay can be segmented to generate a game fragment. A brief description of some illustrative embodiments will serve to highlight certain possibilities for breakpoint determination.

For example, some video games entail control of a character that can be moved from one geographic scene or locale to another scene or locale. The selected portion of the user's gameplay may be determined to be generated from gameplay at a particular scene. In such an embodiment, the boundaries of the particular scene can define the geographic breakpoint for the game fragment, selecting the scene to the exclusion of other scenes, which can entail exclusion of other adjacent or adjoining scenes, as well as scenes which are non-adjacent or non-adjoining or otherwise less related or unrelated to the particular scene. It should be appreciated that the game fragment 510 may entail gameplay from multiple scenes, in which case, the game breakpoint processor 516 may be configured to define breakpoints according to the boundaries of the multiple scenes which are utilized for the recorded gameplay selection. In some cases, the selected game fragment 510 is used to create a playable game fragment that limits game play to the portion of the game that was played in the selected game fragment. In some cases, the playable portion of a playable game fragment created based on a selected game fragment 510 can include portions of the game other than portions that were played in the selected game fragment 510. In one example, the playable game fragment can be used as a starting point for game play that allows access to all of the game title. In another example, the game fragment will allow playing the portion of the game that was played along with other related game content, such as game content that would have been played in the game state getting to the game fragment, adjoining game locations, the remainder of any game level included in the game fragment, or time-based restrictions. In some cases, multiple selected game fragments 510 can be used in the generation of a single playable game fragment, such as to create a game fragment that allows access to the game play done in the multiple game fragments 510.

It should be noted that a scene can be based on data that is geographic, temporal, and/or game state in nature. That is, the scene may not only define a geographic region within a virtual space defined by the video game but may also be configured to exist during a certain time or at a particular chronological point within the larger context of the video game. Such a scene may have game aspects that are determined by game state data, such as if the player is a member of a guild, performed a particular action previously, or the items the player has equipped. Such a scene may have defined objectives or goals that are to be accomplished by the player. Thus, game breakpoints can be defined based on chronology or other temporal aspects as defined by the video game.

Furthermore, a given scene may have associated objects or features which are presented as part of the scene during gameplay. These objects or features may be analyzed to define further breakpoints according to their inclusion. For example, the objects in the scene may be taken from a subset of an asset library, in which case the subset of the asset library can be defined for the game fragment by the game breakpoint processor 516, to the exclusion of other objects in the asset library which are not utilized in the scene(s) associated with recorded gameplay selection. Objects and features can be dynamic elements of a given scene, with associated mechanisms defining their change in response to events occurring in the video game. For example, an object might have a damage modeling module that determines and adjusts the appearance of the object when it is damaged (e.g., when struck by a weapon). A feature could be a vehicle that is made available during the scene, with the vehicle having associated logic which defines its appearance during gameplay as well as its operation and response to user input. Such logic or damage modeling can further define game breakpoints for generation of the game fragment.

Various aspects of a video game which define or are otherwise utilized for a selected portion of a video game can be the basis for defining a game breakpoint. The presently described examples are provided by way of example only and not by way of limitation. It should be appreciated that in other embodiments, other aspects of a video game can form the basis for defining breakpoints to generate a game fragment.

In one embodiment, a video game may be organized into various scenes, which normally must be completed in a linear fashion, such that a later scene cannot be attempted until its preceding scene has first been completed. Each scene can include a number of objectives or goals, some of which may be required for completion of the scene, and some of which may be optional for completion of the scene. Objectives can include navigating from a starting location to a predefined ending location within the scene, surviving for a predefined length of time, destroying a predefined number of enemies, acquiring a certain number of points, defeating a particular enemy, solving one or more puzzles, and/or any other activity which can define an objective within the game. A scene may have various predefined completion points, that is, points wherein the user, once having achieved the completion point, is able to return to that point if the user becomes unable to continue gameplay for some reason (e.g., the user quits the game, the user's game character dies or runs out of lives or health, the user's vehicle crashes, etc.). At predefined completion points, a video game may be configured to automatically save the user's progress or present an option for the user to save their progress.

In one embodiment, the game breakpoint processor 516 is configured to define a game breakpoint at predefined completion points. In one embodiment, this is accomplished by finding the nearest completion points to the selected start and end points of the user's recorded gameplay selection, and utilizing these nearest completion points to define the game breakpoints for the game fragment. In another embodiment, the nearest completion point occurring before the selected start point of the recorded gameplay selection is utilized to define a starting breakpoint, whereas a nearest completion point occurring after the selected end point of the recorded gameplay selection is utilized to define an ending breakpoint for the creation of the game fragment. In still another embodiment, if a completion point lies within a predefined radius of (e.g., either before or after) either of the start or end points of the user's recorded gameplay selection, then that completion point is utilized to define a corresponding start or end game breakpoint for the game fragment. Whereas if no completion point lies within the predefined radius, then a game breakpoint is defined that more closely matches the user's selected start or end point for the recorded selection. In other embodiments, the predefined radius for the start and end points may differ for purposes of determining whether to utilize an existing completion point to define a game breakpoint.

As has been discussed, the game breakpoint processor 516 determines appropriate breakpoints applicable to various aspects of the video game based on analysis of the recorded gameplay selection. The breakpoints defined by the processor 516 serve to define the limited scope of the game fragment that will be produced based on the recorded gameplay selection. In one embodiment, an overlay processor 517 is provided for generating overlays that may contribute to an improved user experience when playing the game fragment generated by the game fragment generator 512. For example, in one embodiment the overlay processor 517 defines pre-game fragment data which defines video or gameplay or additional information that can be provided as an introduction to the game fragment prior to actual gameplay of the game fragment. One example of pre-game fragment data is an introductory video which can provide context to a user who initiates gameplay of became fragment. In another embodiment, pregame fragment data can define introductory gameplay for the game fragment, that may provide a user an opportunity to learn skills that may be useful or required for playing game the fragment. In another embodiment, pregame fragment data may define a series of one or more informational screens or images which provide information about the game fragment to the user. Such information may include controller configuration, story background information, objectives or goals, maps, or any other type of information relating to the game fragment which may be useful for the user or otherwise improve the user's experience of playing the game fragment.

The overlay processor 517 can also be configured to define postgame fragment data. In some embodiments, the postgame fragment data can define video or images to be shown following completion of game play of the game fragment. For example, a congratulatory video might be shown after a user completes the game fragment. Such a video may be customized based on the user's gameplay of the game fragment, for example, by showing information or images that are based on the user's gameplay. In one embodiment, the postgame fragment data can define a playback mechanism to play recorded portions of the user's gameplay of the game fragment following its completion. In another embodiment, the postgame fragment data can be configured to display statistics about the gameplay of the game fragment and may indicate a comparison of the gameplay to that of other users or that of the original creator of the game fragment. In still other embodiments, the postgame fragment data can define additional interactive elements to be presented to the user upon completion of the game fragment. These may include options to purchase in part or in whole the video game upon which the game fragment is based, redirect options to additional sources of information relating to the video game, etc.

In some embodiments, the overlay processor 517 can be configured to define elements which are overlaid into the game fragment. These may include elements that may be customized by a user playing the game fragment, such as customization of characters, objects, properties, and other types of customization options. In some embodiments, the overlay processor 517 may be configured to define simplified elements for a game fragment to reduce the complexity of the game fragment code and the amount of resources required to execute the game fragment. By way of example, many video games include artificial intelligence (AI) entities such as characters, vehicles, enemies, etc. These AI entities may in the full video game be governed by artificial intelligence models that define the reaction and activity of the AI entities based on events occurring in the video game. However, in the context of a game fragment which is of limited scope, it may be acceptable to simply define the activity of an AI entity through hardcoded definition or simplified extrapolations, rather than fully modeling the activity of the AI entity as would be the case in the full video game. In some cases, modifications may be made to a game fragment before it is played. For example, a player may be allowed to change how the character is equipped before starting play. As another example, AI might modify the game state for the fragment to optimize the game play that will result when playing the game fragment to be more likely to align with the player's game play preferences. Another example would allow a player to modify a character's appearance before playing the game fragment. A player may be allowed to modify other portions of the game state, such as the options chosen the last time the player interacted with an NPC or how the player chose to spend points when leveling up the character. In some cases, a game state, or portions of the game state, from one or more other game fragment or portion of a game recording can be used to alter the game state in a game fragment before it is played, such as to replace the character in a game state in the game fragment with the character from a different game state. The entire game state may be replaced before playing a game fragment.

For example, if in the recorded gameplay selection of the full video game a given AI character moves in a certain manner according to its AI model that is unlikely to change in the game fragment, then it may be more efficient to define an approximation of the AI character's movement for the game fragment. Such an approximation would not require the full AI model to be included as part of the game fragment code, yet would provide to the user playing the game fragment a substantially similar experience with respect to that AI character to that of the original user's gameplay from which the game fragment was generated. The resource savings realized through approximation of AI entities activity can be even more significant when multiple AI entities are present and interacting in the user's recorded gameplay selection. For each of the AI entities may have AI models that depend upon the output of those of the other AI entities. However, when gameplay has been recorded the activity of each of these AI entities is known, and therefore can be reproduced in the game fragment through simplified mechanisms such as direct encoding of their controlling variables and approximation of their activity.

With continued reference to FIG. 5, a game set up state processor 518 is provided for defining an initial state of the game fragment. Based on the operation of the game state analyzer 514, the game breakpoint processor 516, and the game set up state processor 518, a code assembly manager 520 assembles various code portions to define the game fragment code 522. When the game fragment code 522 is executed, user gameplay 524 provides input to define the state of execution of the game fragment code, which produces gameplay output including video data and feedback data for rendering the game fragment to the user. The video data can include pregame fragment overlay video 523, game fragment video 525 which is the video resulting from gameplay of the game fragment, and postgame fragment overlay video 526.

It should be appreciated that in one embodiment, the game fragment code 522 is fully self-contained, including all code portions which are required to execute the game fragment. However, in other embodiments, the game fragment code 522 may incorporate references or pointers to existing code portions in the main game code of the full video game. Furthermore, the game fragment code 522 may include reference or utilize existing assets in asset libraries of the main game code of the full video game. However, in other embodiments, new asset libraries can be generated for the game fragment code.

In one embodiment, the game state analyzer 514 can be configured to analyze the game state data 506 of a user's recorded gameplay. Based on the analysis of the user's recorded gameplay, various regions of interest of the user's recorded gameplay can be defined and presented to the user as possible selections from which to generate a game fragment. For example, a region of gameplay characterized by high levels of activity for certain game state variables might define a selection of the user's recorded gameplay. It should be appreciated that the level of activity for a given game state variable can be based on various factors such as a level of intensity, a frequency of activation, a number of replays, etc. In some embodiments, the analysis of the game state variables can entail searching for regions of gameplay wherein the levels of activity of two or more different game state variables are correlated in a predefined manner, e.g., the two or more variables have high levels of activity simultaneously. A high level of activity can be determined based on a predefined threshold. In certain embodiments, a frequency or intensity of live (contemporaneous) feedback from a user (e.g., audible feedback), as described in greater detail with respect to FIG. 7A, can be used to identify regions of gameplay for possible selection, either by a user or by machine learning.

In various embodiments, a region of interest of the user's recorded gameplay may be automatically determined based on threshold detection of any one or more of the following: one or more user inputs, rate of user input, frequency of input, repeats of types of inputs, occurrences of input patterns, combination inputs (e.g., combo keys), motion vectors, pressure exerted on a controller, and/or implicit feedback, e.g., excitation of a user based on captured image or audio data of the user. Another type of feedback from the user can be utilized, such as the amount of time spent playing aspects of the game (including different game areas or different types of play), like crafting vs. hunting monsters, ratings given by the user (which may be detailed to aspects of their game play or game play recordings), analysis of the player activity in an area compared to activities enjoyed by the player, or determinations, which can be generated by AI analysis, of the amount of enjoyment the player has for particular game play experiences or game aspects. Other types of feedback may be inferred from subsequent users that play that game fragment, including their own feedback (as mentioned above) in term of similarities and variances. The variance range can be statistically calculated to arrive at a score of user's interest.

Figure 6A:
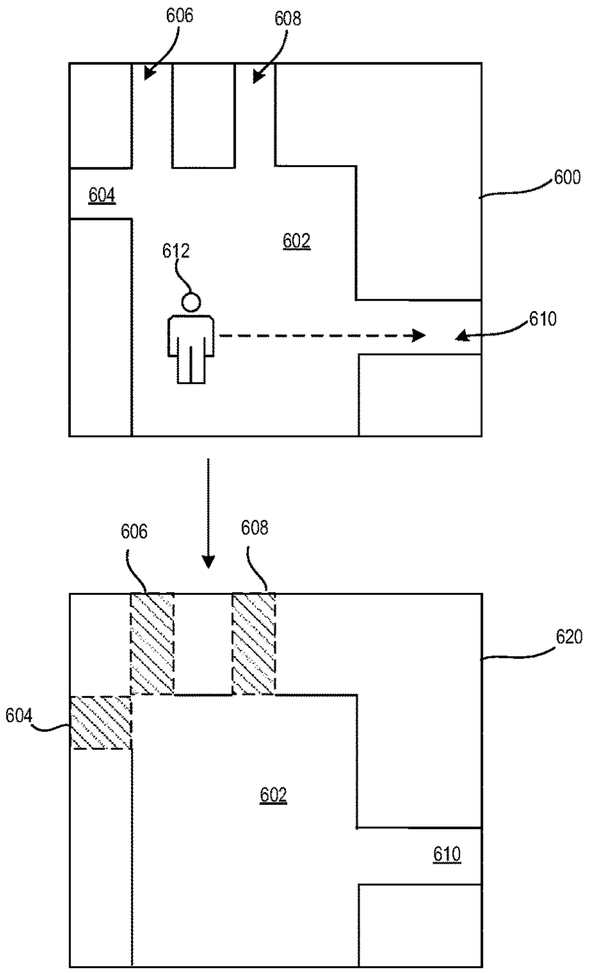
FIG. 6A illustrates modification of a virtual space for purposes of generating a game fragment.

FIG. 6A illustrates modification of a virtual space for purposes of generating a game fragment of a video game. The map 600 represents a scene or a geographical portion of a video game. The map as shown is a two-dimensional representation that may be representative of a three-dimensional virtual space that is navigated and experienced during actual gameplay of the video game. As shown, the map 600 illustrates a region 602, and several paths 604, 606, 608, and 610. In the recorded gameplay of the video game, a user's character 612 moves from the region 602 to the path 610. Based on this recorded movement and other analysis of the gameplay of the video game, it may be determined that the additional paths 604, 606, and 608 are not necessary for generation of the game fragment. The paths may represent incorrect choices as compared to the path 610 or may lead to areas that are not relevant to the game fragment, or may detract from a game fragment player's ability to follow the path and experience similar gameplay to that of the original user. Further, if the areas to which the paths 604, 606, and 608 lead are not to be supported in the game fragment, then the inclusion of such paths could cause confusion among players, or at the least be a poor user experience. Therefore, in a modified map 620, the paths 604, 606, and 608 are made unavailable for gameplay in the game fragment, whereas the path 610, as well as the region 602 remain unchanged. Thus, when a user plays the game fragment that incorporates the topography defined by the map 620, he will experience a virtual space wherein the paths 604, 606, and 608 are not available to traverse. The user will then be more likely to traverse the path 610 as the original user did, thus experiencing similar gameplay.

It will be appreciated that the portion of a virtual space defined for a game fragment or minigame can be defined by boundaries which are determined based on the user's recorded gameplay. The boundaries will define a sub-region of the larger virtual space and include a subset of the features which are available in the larger virtual space. In some embodiments, virtual space boundaries can be determined by determining locations in the virtual space defined by the user's gameplay, and then determining predefined boundaries associated with the virtual space that are nearest to those locations and arranged to encompass them. For example, a user's gameplay may define a path traversed by a user's video game character. This path can be analyzed and based on the path's location in the virtual space, a set of predefined boundaries can be selected to define a region encompassing the path. In some embodiments, predefined boundaries can be defined by specific features which inherently define portions of the virtual space, e.g., doors, windows, walls, rooms, hallways, fences, roads, intersections, hallways, etc.

Figure 6B:
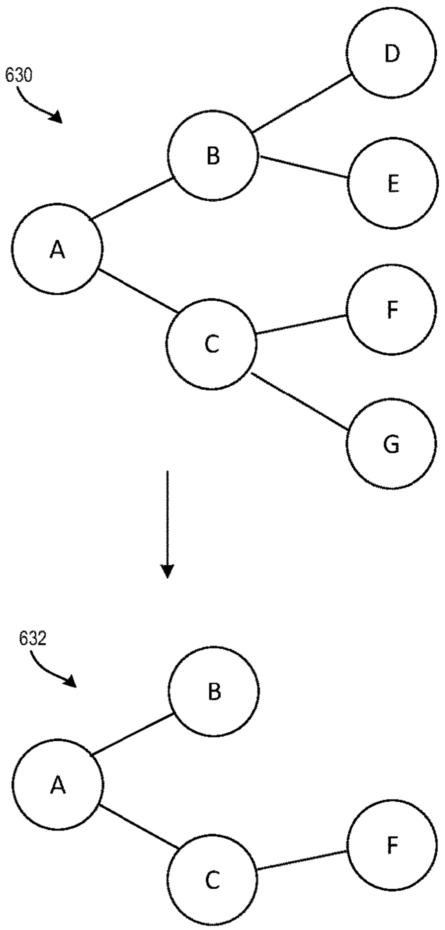
FIG. 6B illustrates modification of a scene graph for purposes of generating a game fragment.

FIG. 6B illustrates modification of a scene graph for purposes of generating a game fragment. A scene graph 630 conceptually illustrates the organization of various scenes A through G of a video game. It should be appreciated that scenes as described herein can be geographic and/or temporal in nature, and each may represent a playable portion of a video game, such as a stage, a level, a section, a location, or any other organizational unit within the video game according to which a player may progress from one scene to another scene. In the scene graph 630, various nodes are shown representative of the scenes A through G. As shown, a player may progress from scene A to scene B, and from scene B to either of scenes D or E. The player may also progress from scene A to scene C, and from scene C to either of scenes F or G. The scene graph 630 is illustrative of the scene organization of the full video game. However, for purposes of creating a game fragment, not all of the available scenes may be required to the game fragment. Thus, by way of example, a scene graph 632 illustrates the organization of scenes for a game fragment. As shown, the scene graph 632 includes scenes A, B, C, and F, but not the remaining scenes which were included in the scene graph 630 of the full video game. Thus, a user may progress from scene A to either of scenes B or C, and from scene C to scene F. However, the other scenes from the full video game scene graph 630 are not available for gameplay in the game fragment. As has been described, systems in accordance with embodiments of the invention can be configured to limit the inclusion of scenes when generating a game fragment. In this manner, the game fragment does not include scenes which are not required for the limited context of its gameplay and intended purpose.

In some embodiments, game fragments are automatically generated using machine learning (ML) rather than, or in addition to, being created by users. For example, as shown in FIG. 7A, an artificial intelligence (AI) engine 702 may receive various input including, without limitation, one or more recorded games 704, live game feedback 706, and game statistics 708. The AI engine 702 may include or have access to a trained ML model 703, such as a large language model (LLM), bi-directional transformer, zero/few shot learner, or deep neural network (DNN). The ML model 703 may be used by the AI engine 702 to predict game fragment(s) 710 of the recorded game(s) 704 that will result in higher completion rates, increased positive feedback, greater activity, and/or more positive ratings by users or a particular user. The ML model 703 may have been previously trained using predetermined or automatically generated fragments of recorded gameplay, as well as indications of whether those fragments were completed by users, produced positive feedback, resulted in elevated levels of activity, and/or received high ratings by users.

The recorded game(s) 704 may include recorded gameplay by one or more human players, as described in connection with FIG. 4A. In certain embodiments, at least some of the recorded game(s) 704 may have been completed by AI players, which evaluate gameplay output and produce user input in the same manner as a human player.

The live game feedback 706 may have been captured contemporaneously from one or more human users playing the recorded game(s) 704. For example, the live game feedback 706 may include, without limitation, audible feedback, visual feedback, motion feedback, textual feedback, and/or vital signs feedback, all of which may indicate excitement, enjoyment, and/or engagement of the user with the video game at the time the feedback 706 is received. Various levels of processing of the data from various input devices 707A-E may be done by a live game feedback processor (which may correspond to reference numeral 706) before passing on data generated from the processing with all, none, or portions of the raw data from the input devices.

The audible feedback may be captured, for example, by a microphone 707A associated with a game console, game controller, or VR headset, and may include verbal expressions of excitement and/or various emotions experienced during gameplay, such as happiness, sadness, fear, disgust, and anger. Likewise, the visual feedback may include emotional expressions on the user's face (e.g., the user is smiling), eye tracking (as an indicator of attention or engagement), and the like, which may be captured by a camera 707B associated with the game console, game controller, or VR headset.

The motion feedback may be obtained from a motion sensor 707C, such as one or more accelerometers, magnetometers, cameras, and/or gyroscopes, associated with the game console, game controller, or VR headset. The textual feedback may be any form of user commentary including, without limitation, chats, emails, direct messages, ratings, and the like, which may be received via a user input device 707D, such as a game controller in conjunction with a displayed virtual keyboard, but may also include traditional user input devices, such as keyboards, mice, touch screens, or the like. The vital signs feedback may be any vital signs (e.g., heart rate or temperature) obtained via a vital signs monitor 707E (e.g., smart watch, smart ring, or suitably equipped game controller) monitoring the user during gameplay.

The game statistics 708 may include, without limitation, information about the structure of the recorded game(s) 704 (as shown in FIG. 4A) including the level and/or scene structure, activity levels within various game sections (i.e., which sections of the video game are played the most or generate the most input data), points at which user(s) quit playing the recorded game(s) 704, points at which user(s) completed a game section at a lower (or higher) than average time, user feedback or ratings for the recorded game(s) 704 or sections thereof, and the like.

Based on the various inputs, the ML model 703 of the AI engine 702 may output game fragments 710 (e.g., time ranges or indications of levels, scenes, or portions thereof) that are predicted to have higher completion rates, increased positive feedback, greater activity, and/or more positive ratings by users or a particular user. The game fragments 710 may be of different lengths in order to provide for various time budgets available to different users. For example, a game fragment 710 may include an entire scene that takes 30 minutes to complete or a subset of the scene that takes 10 minutes to complete. In some embodiments, game fragments 710 may be generated for both the scene and the subset of the scene, which may appeal to users with different time budgets.

In some embodiments, the game fragments 710 are then used in accordance with the techniques described in FIG. 5 to create game fragment code playable by the user as a minigame. For example, the game state analyzer analyzes the game state of the game fragment and based on the analysis, the game breakpoint processor determines appropriate breakpoints to define the beginning and ending of the game fragment. Based on the operation of the game state analyzer, the game breakpoint processor, and the game set up state processor, the code assembly manager assembles various code portions to define the game fragment code. The game fragment code is fully self-contained, including all code portions that are required to execute the game fragment 710.

The created game fragment(s) 710 may be stored in a video game library 312, as shown in FIG. 3. The game fragment(s) 710 are then available to users to play, including users that may not have sufficient time to play entire games, but are nevertheless interested in playing discrete portions of games including specific challenges, puzzles, and the like.

Once a game fragment 710 is played by a user, the user may provide explicit and/or implicit game fragment feedback 712. Explicit game fragment feedback 712 may be in the form of a rating, such as a graphic rating, a numerical rating, a descriptive rating, and/or a comparative rating. Implicit game fragment feedback 712 may include whether the user completed the game fragment 710 (non-completion may be considered negative feedback in some embodiments) and/or the live game feedback 706 described in connection with FIG. 7A, such as audible feedback, visual feedback, motion feedback, textual feedback, and/or vital signs feedback. Occasionally, some game fragment feedback 712 may be positive (e.g., the user completed the minigame), while other game fragment feedback 712 suggests otherwise (e.g., the audible feedback has verbal cues indicating that the user did not enjoy the game fragment 710). The negative implicit game fragment feedback 712 may take presence in some embodiments as being more accurate or relevant. Alternatively, various positive and negative feedback may be assigned different weights to determine an overall game fragment feedback 712 for the user. In some cases, the user may rate different aspects of the same game fragment, which may result in some aspects being rated positively and some aspects being rated negatively, such as rating the puzzle elements as being very enjoyable but the combat elements as being too difficult.

Figure 7A:
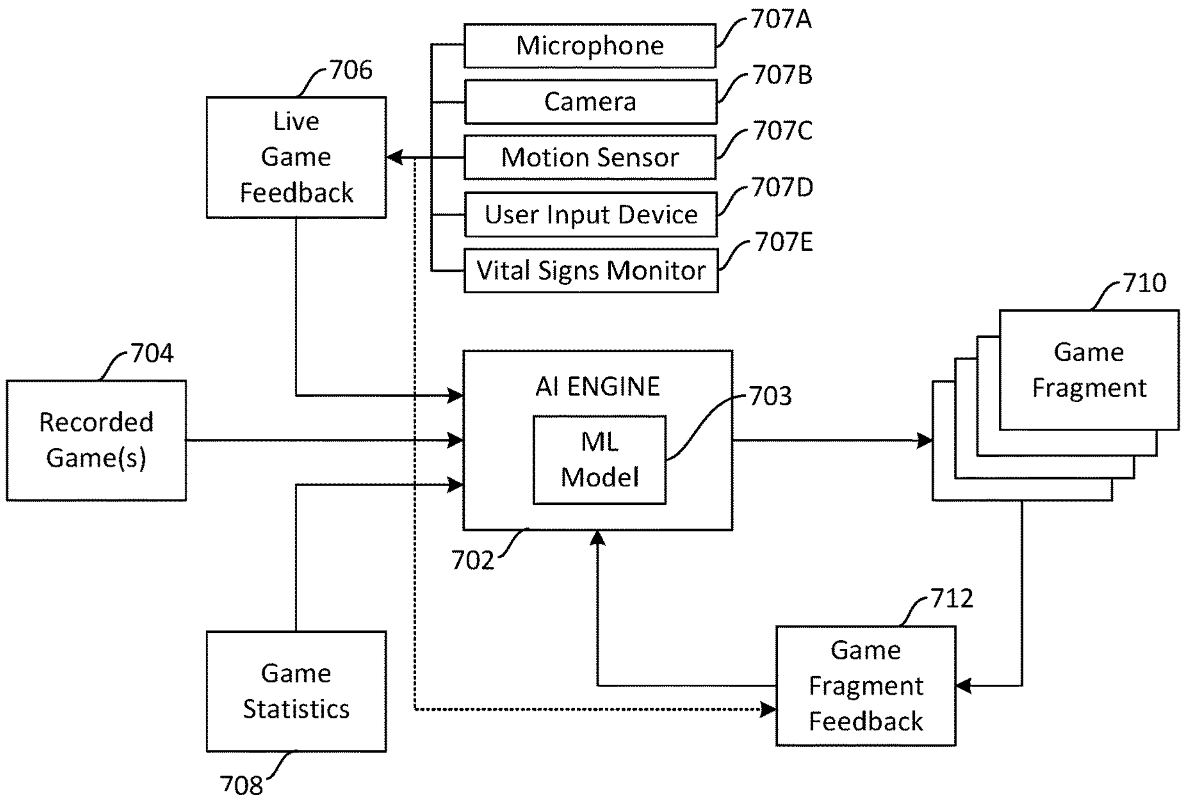
FIG. 7A illustrates a system for automatically creating one or more game fragments using machine learning.

As shown in FIG. 7A, the game fragment feedback 712 is then used to update the ML model 703 of the AI engine 702, such that the ML model 703 will generate game fragments 710 in the future that have higher completion rates, increased positive feedback, greater activity, and/or more positive ratings. For example, if the game fragment feedback 712 was positive, the logic (e.g., neurons, nodes, weights) used by the ML model 703 to generate the game fragment(s) 710 will be strengthened, making it more likely that similar game fragment(s) 710 will be generated in the future for similar input. Conversely, if the game fragment feedback 712 was negative, the logic used by the ML model 703 to generate the game fragment(s) 710 will be weakened, making it less likely that game fragment(s) 710 will be generated for similar input in the future.

Figure 7B:
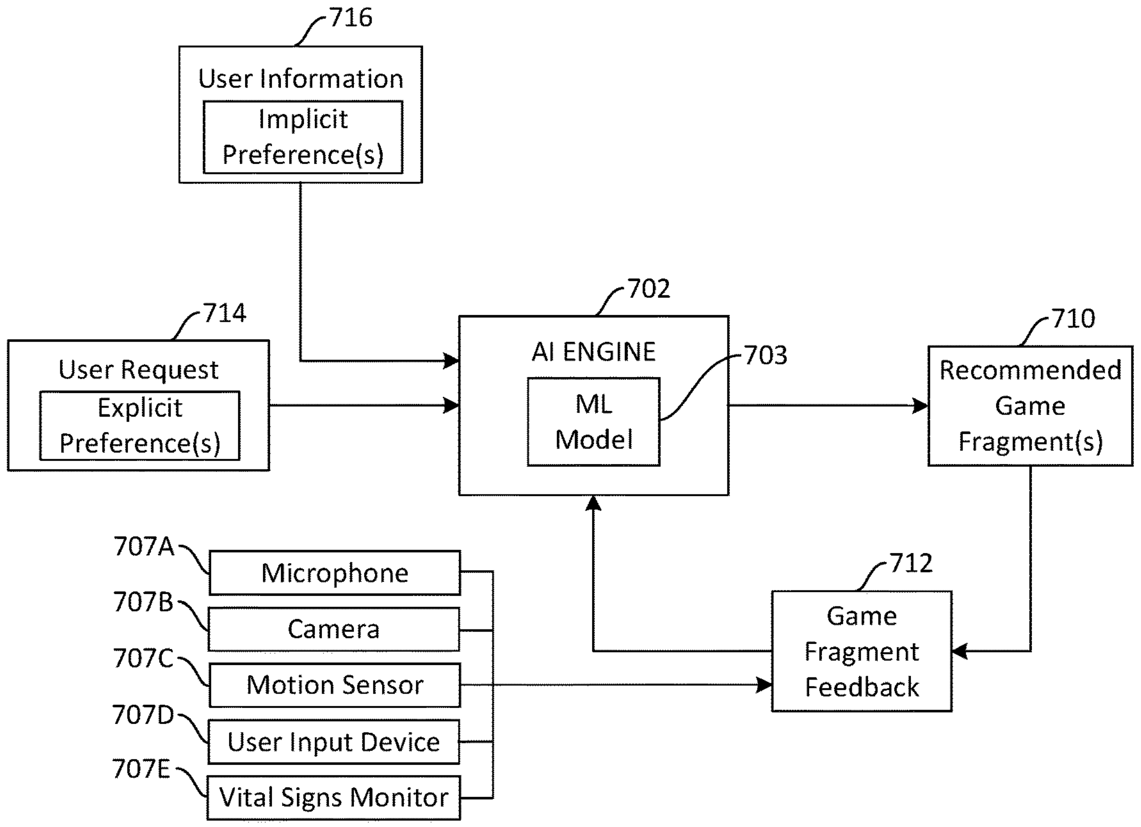
FIG. 7B illustrates a system for automatically recommending one or more game fragments using machine learning.

Referring to FIG. 7B, the AI engine 702 (or another AI engine) may be used to recommend game fragments 710 to a user. As previously noted, some games are meant to be played over many hours, which may not equate with the user's budgeted time for a gaming session. Consequently, the user may avoid turning on a video game console and opt instead for watching television or participating in another non-gaming activity when it is perceived that there is insufficient time to play a lengthy video game. Accordingly, when a user signs into a video game console and/or activates a particular application, such as a game launcher, the AI engine 702 may recommend at least one game fragment 710 to a user that is likely to be completed, receive positive feedback, and/or be positively rated by the user based on information available to the AI engine 702 about the user.

In one embodiment, the AI engine 702 receives a user request 714, which may be a result of the user signing into the video game console and/or activating the game launcher application. The user request 714 may include explicit preferences for a video gaming session, such as a specific amount of time that the user has to play, e.g., 10 minutes, 30 minutes, or one hour. In some embodiments, the user request 714 may also include a specific type of game (e.g., role-playing, platform, action, adventure, first-person shooter, sports, simulation, fighting) and/or a specific game title that the user wishes to play in the time they have available. In certain embodiments, the request 714 may include a specific interest that the user has for the gaming session, e.g., consumption of time, improving their skill set, challenge, advancement, time trial (e.g., speed run), etc.

Alternatively, or in addition, any or all of the foregoing may be inferred from user information 716 available to the AI engine 702. For example, the user information 716 may include the user's schedule (e.g., from a calendar application), historical data about the user's playing habits (e.g., the user typically plays for an hour at the same time each day), etc. The user information 716 may further include historical data about the types and/or genres of games the user likes to play, a most recent game title being played by the user, and/or specific interests of the user relating to gaming sessions. In some embodiments, the user information 716 further includes information about the user's skill level, games played, achievements won, previous user feedback on games and game fragments, etc.

Using a ML model 703, which may be the same or a different ML model 703 used in connection with FIG. 7A, the AI engine 702 may select a previously created game fragment 710 and/or create a new game fragment 710 based on the user request 714 and user information 716 (and, in some embodiments, the live game feedback 706 and/or game statistics 708 discussed with reference to FIG. 7A). In certain embodiments, the user may be provided with multiple recommended game fragments 710, e.g., game fragments 710 of different lengths, genres, goals, titles, etc., that align with the user's explicit or implicit interests, including time availability. The recommended game fragments 710 may then be used in accordance with the techniques described in FIG. 5 to create game fragment code playable by a user as a minigame.

Once a minigame is played by the user, the user may provide explicit and/or implicit game fragment feedback 712. Explicit game fragment feedback 712 may be in the form of a rating (e.g., numerical rating or star rating) and/or an indication of whether the user completed the minigame. Non-completion of the minigame may be considered negative feedback in some embodiments. Implicit game fragment feedback 712 may be similar or identical to the live game feedback 706 described in connection with FIG. 7A, such as audible feedback, visual feedback, motion feedback, textual feedback, and/or vital signs feedback.

As shown in FIG. 7B, the game fragment feedback 712 is then used to update the ML model 703 of the AI engine 702, such that the AI engine 702 will recommended game fragments 710 in the future that have higher completion rates, increased positive feedback, greater activity, and/or more positive ratings. In other words, if the game fragment feedback 712 was positive, the logic (e.g., neurons, nodes, weights) used by the ML model 703 to recommend the game fragment 710 will be strengthened, making it more likely that similar game fragments 710 will be recommended in the future for similar input. Conversely, if the game fragment feedback 712 was negative, the logic used by the ML model 703 to recommend the game fragment 710 will be weakened, making it less likely that game fragment 710 will be recommended for similar input in the future.

Figure 8A:
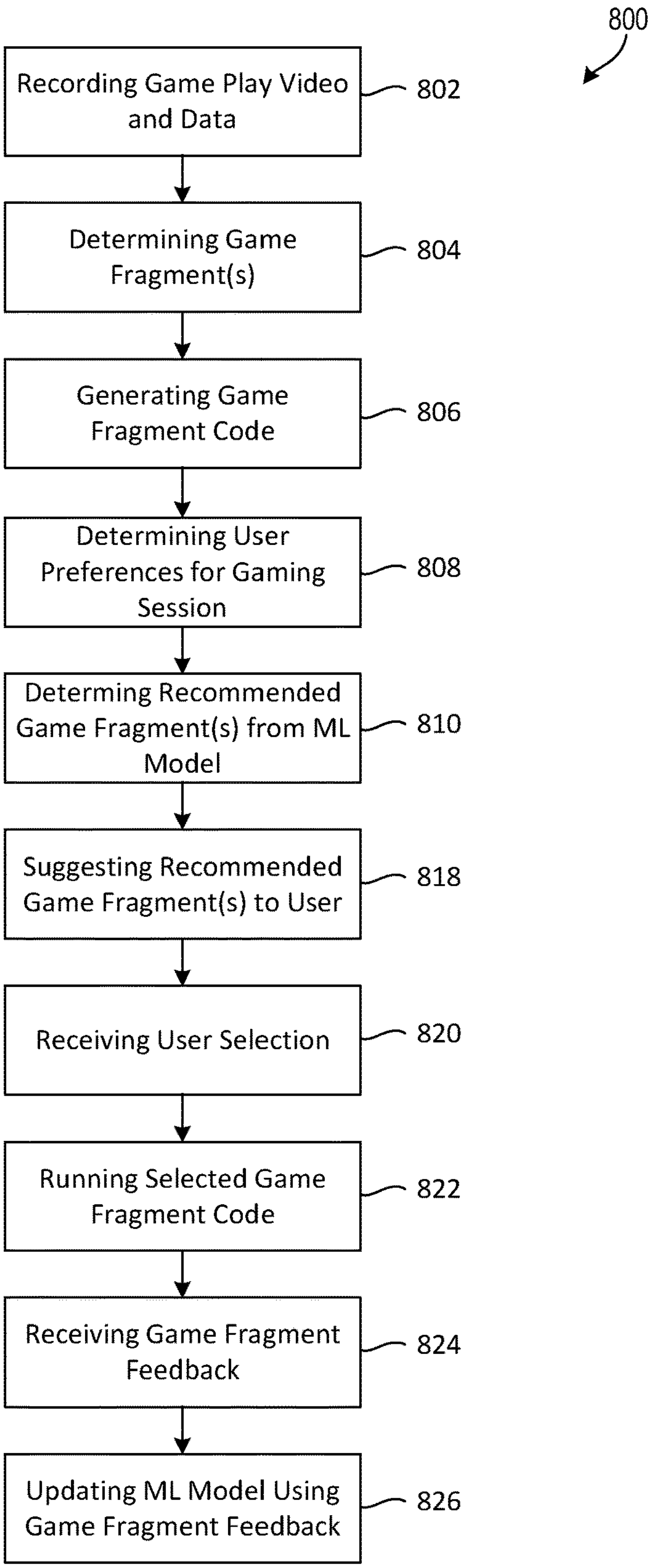
FIG. 8A illustrates a flowchart of a method for recommending one or more game fragments.

FIG. 8A is a flowchart of a method 800 for recommending a game fragment to a user. According to some examples, the method 800 includes recording 802 game play video and game data, such as input data and game state data, for one or more video games. The method 800 continues by determining 804 one or more game fragments. The determination may be performed by a user, as described with reference to FIGS. 4A-B, in which the user manipulates a gameplay timeline to select a portion thereof as a game fragment. Alternatively, or in addition, the determination may be made automatically using a machine learning model based on live game feedback and game statistics.

In some examples, the method 800 continues with generating 806 game fragment code, as described with reference to FIG. 5. Specifically, the game set up state processor defines an initial state of the game fragment. The game state analyzer analyzes the game state of the game fragment and, based on the analysis, the game breakpoint processor determines appropriate breakpoints to define the beginning and ending of the game fragment. Based on the operation of the game state analyzer, the game breakpoint processor, and the game set up state processor, the code assembly manager assembles various code portions to define the game fragment code. The game fragment code is fully self-contained, including all code portions which are required to execute the game fragment.

Figure 8B:
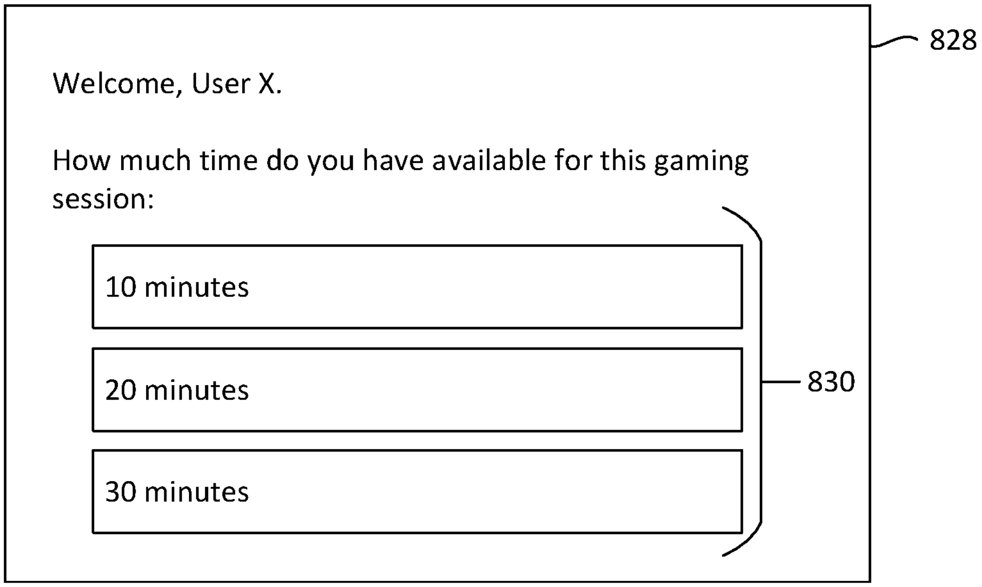
FIG. 8B illustrates a user interface for receiving a preference for an amount of time for a gaming session.
Figure 8C:
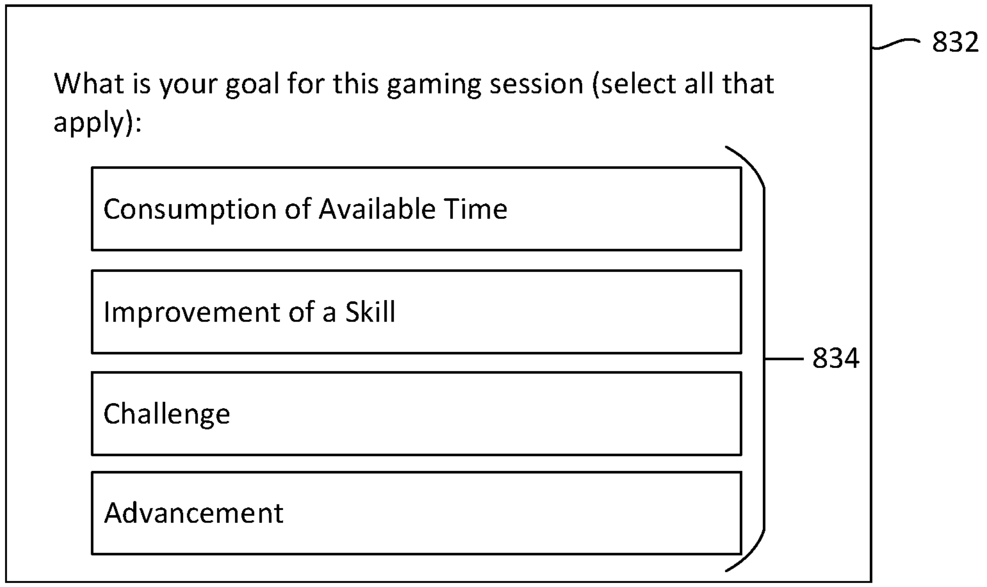
FIG. 8C illustrates a user interface for receiving a preference for a goal for a gaming session.

In some examples, the method 800 continues by determining 808 preferences of a user for a particular gaming session. This determination may be made by receiving explicit input from the user. For example, as shown in FIG. 8B, a user interface 828 of a game launcher application may prompt the user to select an amount of available time 830 for the gaming session. Similarly, as shown in FIG. 8C, a user interface 832 may prompt the user to specify a goal 834 for the gaming session, e.g., consumption of available time, improvement of a skill, challenge, time trial, and/or advancement. A wide variety of explicit user preferences may be received via direct user input.

In other embodiments, the user preferences may be obtained or inferred from available information about the user. For example, the user's calendar application may have set aside time for the gaming session, which can be accessed and used to determine the available time 830 without user input. In some cases, more than one users and/or their friends' calendar application may set aside time for a team gaming session. Alternatively, or in addition, historical user behavior can be used by the AI engine 702 to determine the probable available time 830 and/or goal 834 for the gaming session. For example, if the user typically plays a gaming session for 60 minutes after work, the AI engine 702 may use a ML model trained with prior user behavior to determine the available time 830 for the gaming session.

Referring again to FIG. 8A, the method 800 continues in one embodiment by determining 810 one or more recommended game fragments using the AI engine 702 (and ML model 703) described in connection with FIG. 7B. The AI engine 702 may select from a number of previously generated game fragments, which were either created by a user (FIGS. 4A-B) or automatically selected by the AI engine 702 (FIG. 7A). In some cases, the AI engine 702 may generate a new game fragment that satisfies any user preferences determined in step 808. For example, the user information 716, including user preferences, discussed in connection with FIG. 7B, could be provided to the AI engine 702 with one or more of the recorded games 704, live game feedback 706, and game statistics 708, as described with reference to FIG. 7A. The output of the AI engine 702 may include one or more recommended game fragments 710, which could then be converted into playable fragment code 522 (e.g., minigame) as described in connection with FIG. 5.

Figure 8D:
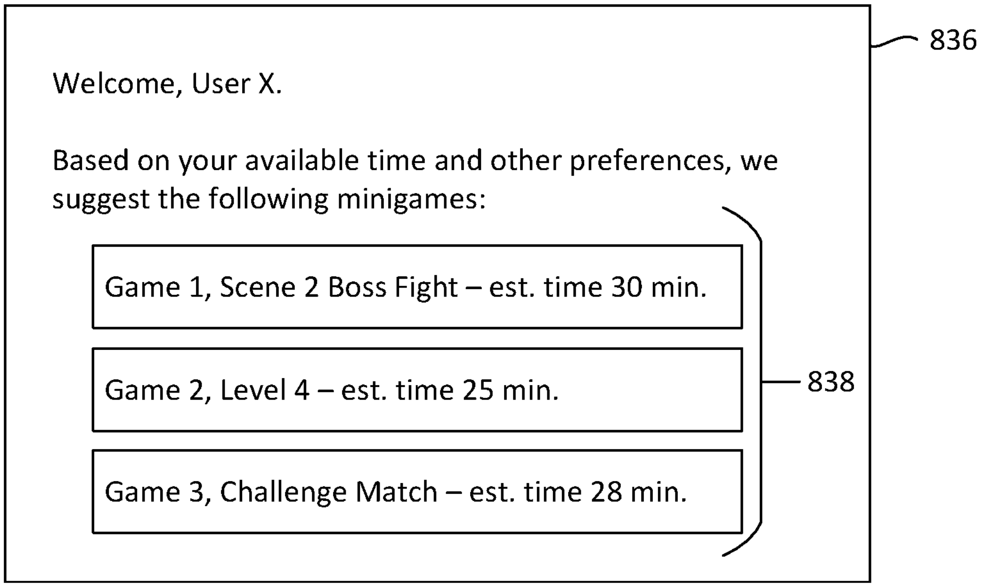
FIG. 8D illustrates a user interface for receiving a selection of a recommended minigame.

In some examples, the method 800 continues by suggesting 818 the one or more recommended game fragment(s) to the user. For example, as shown in FIG. 8D, a user interface 836 may present the user with a selection of minigames 838 (playable game fragment code 522), each of which may satisfy the user's explicit or implicit preferences. The minigames 838 may correspond to a number of different video game titles and may be of different lengths. In some embodiments, the listed minigames 838 may specify, without limitation, a game title, a level and/or scene name, a minigame type (e.g., boss fight, challenge match), as well as an estimated time for completion. If the minigames 838 have been previously played by other users, the user interface 836 may also include ratings, comments, and the like.

Referring again to FIG. 8A, the method 800 continues, in one embodiment, by receiving 820 a user selection of one of the minigames 838 shown in FIG. 8D and running 822 the corresponding game fragment code 522. The user may then play the minigame 838 as though it were a standalone video game.

Figure 8E:
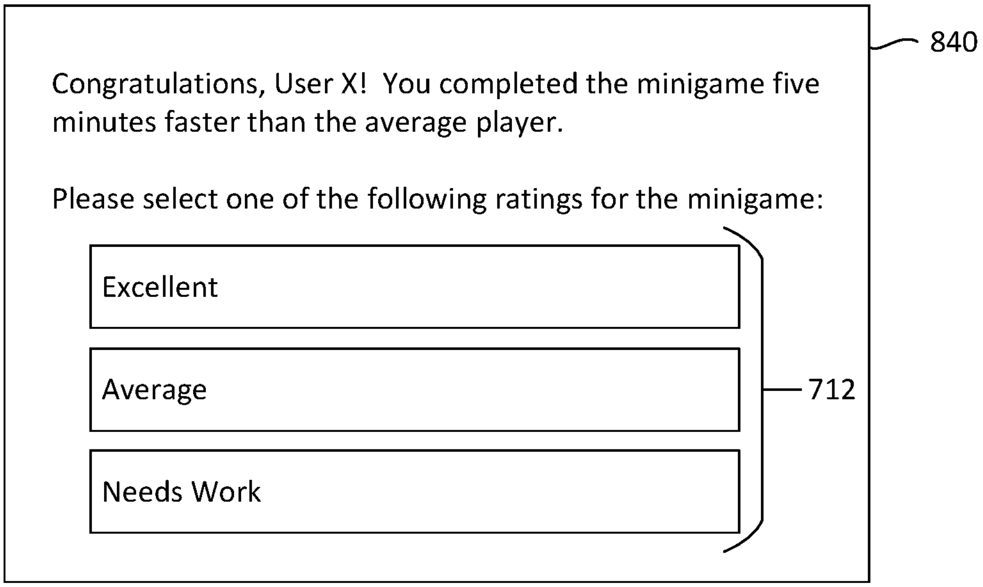
FIG. 8E illustrates a user interface for receiving feedback for a minigame.

In some examples, the method 800 continues by receiving 824 game fragment feedback. As shown in FIG. 8E, user interface 840 may receive explicit game fragment feedback 712 from a user in the form of a rating, such as a graphic rating, a numerical rating, a descriptive rating, and/or a comparative rating. Alternatively, or in addition, the game fragment feedback 712 may be implicit, such as whether the user completed the game fragment and/or the live game feedback 706 discussed in connection with FIG. 7A, which may include, for example, audible feedback, visual feedback, motion feedback, textual feedback, and/or vital signs feedback, all of which may indicate heightened or lessened engagement with, or enjoyment of, the selected minigame 838.

Referring again to FIG. 8A, the method 800 may proceed by updating 826 the ML model 703 of FIG. 7B based on the game fragment feedback 712. If the game fragment feedback 712 was positive, the logic (e.g., neurons, nodes, weights) used by the ML model 703 to select the game fragment 710 will be strengthened, making it more likely the game fragment 710 will be recommended for similar input in the future. On the other hand, if the game fragment feedback 712 was negative, the logic used by the ML model 703 to select the recommended game fragment 710 will be weakened, making it less likely that the game fragment 710 will be recommended for similar input in the future.

Figure 9:
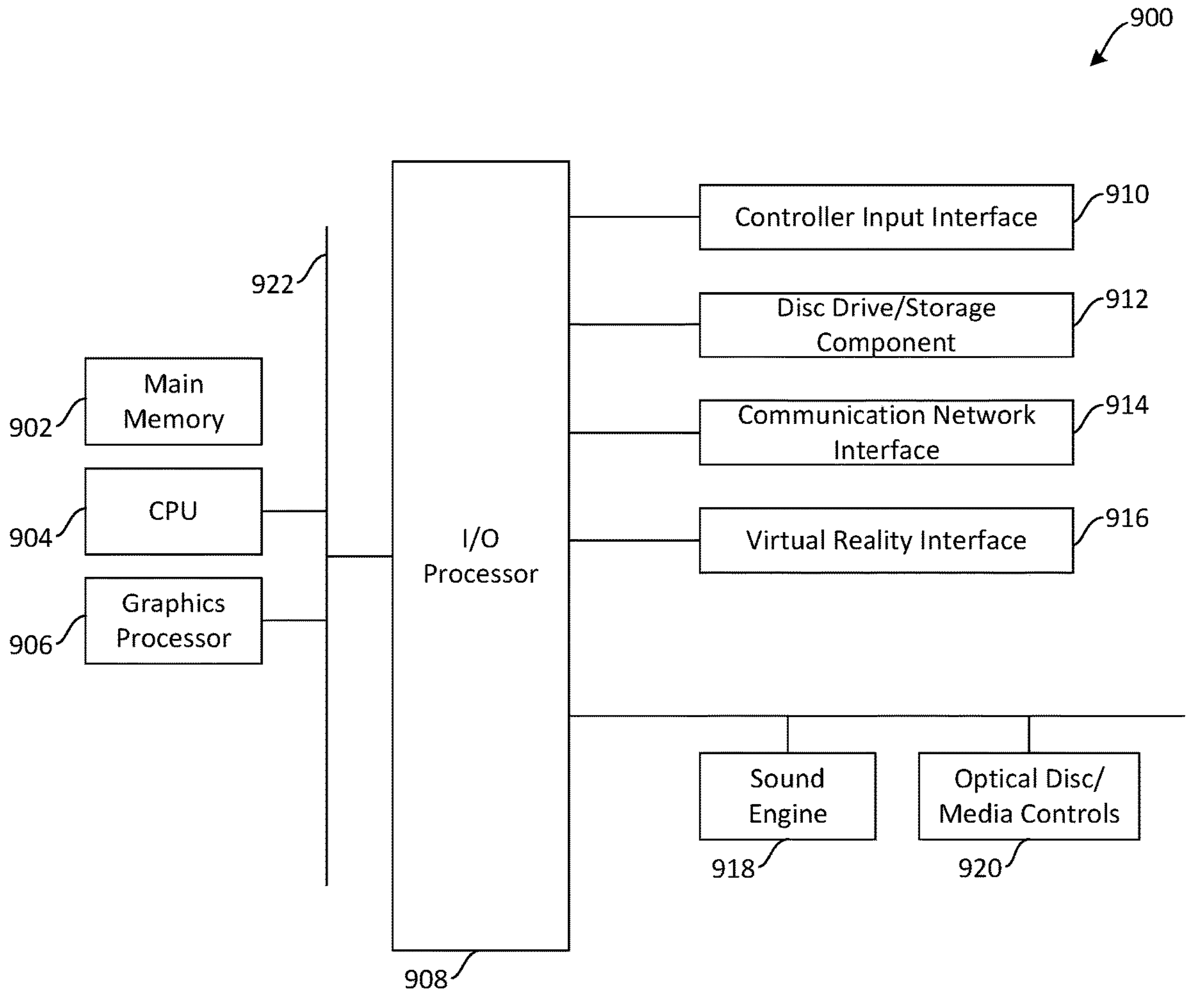
FIG. 9 illustrates a block diagram of an exemplary electronic entertainment system.

FIG. 9 illustrates a block diagram of an exemplary electronic entertainment system 900, which may be used in the context of the cloud gaming system shown in FIG. 2. The electronic entertainment system 900 as illustrated in FIG. 9 includes a main memory 902, a central processing unit (CPU) 904, graphic processor 906, an input/output (I/O) processor 908, a controller input interface 910, a hard disc drive or other storage component 912 (which may be removable), a communication network interface 914, a virtual reality interface 916, sound engine 918, and optical disc/media controls 920. Each of the foregoing are connected via one or more system buses 922.

Electronic entertainment system 900 as shown in FIG. 9 may be an electronic game console. The electronic entertainment system 900 may alternatively be implemented as a general-purpose computer, a set-top box, a hand-held game device, a tablet computing device, or a mobile computing device or phone. Electronic entertainment systems may contain some or all of the disclosed components depending on a particular form factor, purpose, or design.

Main memory 902 stores instructions and data for execution by CPU 904. Main memory 902 can store executable code when the electronic entertainment system 900 is in operation. Main memory 902 of FIG. 9 may communicate with CPU 904 via a dedicated bus. Main memory 902 may provide pre-stored programs in addition to programs transferred through the I/O processor 908 from hard disc drive/storage component 912, a DVD or other optical disc (not shown) using the optical disc/media controls 920, or as might be downloaded via communication network interface 914.

The graphics processor 906 of FIG. 9 (or graphics card) executes graphics instructions received from the CPU 904 to produce images for display on a display device (not shown). The graphics processor 906 of FIG. 9 may transform objects from three-dimensional coordinates to two-dimensional coordinates, and vice versa. Graphics processor 906 may use ray tracing to aid in the rendering of light and shadows in a game scene by simulating and tracking individual rays of light produced by a source. Graphics processor 906 may utilize fast boot and load times, 4K-8K resolution, and up to 120 FPS with 120 hz refresh rates. Graphics processor 906 may render or otherwise process images differently for a specific display device.

I/O processor 908 of FIG. 9 may also allow for the exchange of content over a wireless or other communications network (e.g., IEEE 802.x inclusive of Wi-Fi and Ethernet, 9G, 4G, LTE, and 3G mobile networks, and Bluetooth and short-range personal area networks). The I/O processor 908 of FIG. 9 primarily controls data exchanges between the various devices of the electronic entertainment system 900 including the CPU 904, the graphics processor 906, controller interface 910, hard disc drive/storage component 912, communication network interface 914, virtual reality interface 916, sound engine 918, and optical disc/media controls 920.

A user of the electronic entertainment system 900 of FIG. 9 provides instructions via a controller device communicatively coupled to the controller interface 910 to the CPU 904. A variety of different controllers may be used to receive the instructions, including handheld and sensor-based controllers (e.g., for capturing and interpreting eye-tracking-based, voice-based, and gestural commands). Controllers may receive instructions or input from the user, which may then be provided to controller interface 910 and then to CPU 904 for interpretation and execution. The instructions may further be used by the CPU 904 to control other components of electronic entertainment system 900. For example, the user may instruct the CPU 904 to store certain game information on the hard disc drive/storage component 912 or other non-transitory computer-readable storage media. A user may also instruct a character in a game to perform some specified action, which is rendered in conjunction with graphics processor 906, inclusive of audio interpreted by sound engine 918.

Hard disc drive/storage component 912 may include removable or non-removable non-volatile storage medium. Saud medium may be portable and inclusive of digital video disc, Blu-Ray, or USB coupled storage, to input and output data and code to and from the main memory 902. Software for implementing embodiments of the present invention may be stored on such a medium and input to the main memory via the hard disc drive/storage component 912. Software stored on a hard disc drive may also be managed by optical disk/media control 920 and/or communications network interface 914.

Communication network interface 914 may allow for communication via various communication networks, including local, proprietary networks and/or larger wide-area networks such as the Internet. The Internet is a broad network of interconnected computers and servers allowing for the transmission and exchange of Internet Protocol (IP) data between users connected through a network service provider. Examples of network service providers include public switched telephone networks, cable or fiber services, digital subscriber lines (DSL) or broadband, and satellite services. Communications network interface allows for communications and content to be exchanged between the various remote devices, including other electronic entertainment systems associated with other users and cloud-based databases, services and servers, and content hosting systems that might provide or facilitate game play and related content.

Virtual reality interface 916 allows for processing and rendering of virtual reality, augmented reality, and mixed reality data. This includes display devices such that might be partial or entirely immersive virtual environments. Virtual reality interface 916 may allow for exchange and presentation of immersive fields of view and foveated rendering in coordination with sounds processed by sound engine 918 and haptic feedback.

Sound engine 918 executes instructions to produce sound signals that are outputted to an audio device such as television speakers, controller speakers, stand-alone speakers, headphones, or other head-mounted speakers. Different sets of sounds may be produced for each of the different sound output devices. This may include spatial or three-dimensional audio effects.

Optical disc/media controls 920 may be implemented with a magnetic disk drive or an optical disk drive for storing, managing, and controlling data and instructions for use by CPU 904. Optical disc/media controls 920 may be inclusive of system software (an operating system) for implementing embodiments of the present invention. That system may facilitate loading software into main memory 902.

The systems and methods described herein can be implemented in hardware, software, firmware, or combinations of hardware, software and/or firmware. In some examples, systems described in this specification may be implemented using a non-transitory computer readable medium storing computer executable instructions that when executed by one or more processors of a computer cause the computer to perform operations. Computer readable media suitable for implementing the control systems described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application-specific integrated circuits. In addition, a computer readable medium that implements a control system described in this specification may be located on a single device or computing platform or may be distributed across multiple devices or computing platforms.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method comprising:

obtaining one or more preferences of a user for a video gaming session;

generating, using a trained machine learning model, a playable fragment of a video game based on a match with the one or more preferences and based on analyzed gameplay of the video game recommending the playable fragment to the user;

receiving feedback of the user while or after the user plays the playable fragment; and updating the trained machine learning model based on the feedback.

2. The computer-implemented method of claim 1, wherein obtaining the one or more preferences comprises receiving at least one explicit preference of the user.

3. The computer-implemented method of claim 1, wherein obtaining the one or more preferences comprises determining at least one implicit preference of the user from one or more of user calendar data and user historical data.

4. The computer-implemented method of claim 1, wherein the one or more preferences include a preferred amount of time for the video gaming session.

5. The computer-implemented method of claim 1, wherein the one or more preferences include a purpose for the video gaming session, the purpose including at least one of consumption of available time, improvement of a skill, challenge, and advancement.

6. The computer-implemented method of claim 1, wherein the feedback comprises audible feedback recorded by a microphone associated with a client device used to play the playable fragment.

7. The computer-implemented method of claim 1, wherein the feedback comprises visual feedback recorded by a camera associated with a client device used to play the playable fragment.

8. The computer-implemented method of claim 1, wherein the feedback comprises motion feedback recorded by a motion sensing device associated with a client device used to play the playable fragment.

9. The computer-implemented method of claim 1, wherein the feedback comprises textual feedback or a rating recorded by an input device associated with a client device used to play the playable fragment.

10. The computer-implemented method of claim 1, wherein the feedback comprises vital sign feedback recorded by a vital sign monitor associated with a client device used to play the playable fragment.

11. The computer-implemented method of claim 1, wherein generating the playable fragment from the video game further comprises:

recording gameplay of the video game including one or more of user input data and game state data generated by processing the user input data by a video game processor;

analyzing, by a game state analyzer, the recorded gameplay to determine a region of interest based on at least one of user gameplay feedback or levels of activity of the user input data or the game state data;

defining, by a breakpoint processor, boundaries within a gameplay context of the video game based on the region of interest that define options for selection of a beginning and an end for the playable fragment; and generating, by a fragment generator, the playable fragment based on the selection defined from the boundaries.

12. The computer-implemented method of claim 11, wherein recording gameplay of the video game comprises recording gameplay of the video game by a cloud gaming system including at least one server computer in communication with a client device over a network, wherein the client device is used to play the video game.

13. The computer-implemented method of claim 11, wherein one or more of analyzing the recorded gameplay and defining the boundaries are performed by the trained machine learning model or is another machine learning model based on the at least one of the user gameplay feedback or the levels of activity of the user input data or the game state data.

14. The computer-implemented method of claim 11, wherein the user gameplay feedback is obtained contemporaneously with the recorded gameplay and includes one or more of audible feedback, visual feedback, textual feedback, motion feedback, and vital signs feedback.

15. A system comprising:

one or more processors; and one or more memories including instructions executable by the one or more processors to cause the one or more processors to perform operations comprising:

obtain one or more preferences of a user for a video gaming session;

generate, using a trained machine learning model, a playable fragment of a video game based on a match with the one or more preferences and based on analyzed gameplay of the video game recommend the playable fragment to the user;

receive feedback of the user while or after the user plays the playable fragment; and update the trained machine learning model based on the feedback.

16. The system of claim 15, wherein obtaining the one or more preferences comprises receiving at least one explicit preference of the user.

17. The system of claim 15, wherein the operations further comprise obtaining the one or more preferences comprises determining at least one implicit preference of the user from one or more of user calendar data and user historical data.

18. The system of claim 15, wherein the one or more preferences include a preferred amount of time for the video gaming session.

19. The system of claim 15, wherein the one or more preferences include a purpose for the video gaming session, the purpose including at least one of consumption of available time, improvement of a skill, challenge, and advancement.

20. The system of claim 15, wherein the feedback comprises audible feedback, and wherein the system further comprises a client device to play the playable fragment, the client device including a camera to record the audible feedback.

21. The system of claim 15, wherein the feedback comprises visual feedback, the system further comprising a client device to play the playable fragment, the client device including a camera to record the visual feedback.

22. The system of claim 15, wherein the fragment feedback comprises motion feedback, the system further comprising a client device to play the playable fragment, the client device including a motion sensing device to receive the motion feedback.

23. The system of claim 15, wherein the feedback comprises textual feedback or a rating, the system further comprising a client device to play the playable fragment, the client device including an input device to receive the textual feedback.

24. The system of claim 15, wherein the fragment feedback comprises vital sign feedback, the system further comprising a client device to play the playable fragment, the client device including vital sign monitor to receive the vital sign feedback.

25. The system of claim 15, wherein the operations further comprise:

recording gameplay of the video game including one or more of user input data and game state data generated by processing the user input data by a video game processor;

analyzing the recorded gameplay to determine a region of interest based on at least one of user gameplay feedback or levels of activity of the user input data or the game state data;

defining boundaries within a gameplay context of the video game based on the region of interest that define options for selection of a beginning and an end for the playable fragment; and generating the playable fragment based on the selection defined from the boundaries.

26. The system of claim 25, wherein the system further comprises a cloud gaming system including at least one server computer in communication with a client device over a network, wherein the client device is used to play the video game.

27. The system of claim 25, wherein one or more of analyzing the recorded gameplay and defining the boundaries are performed by the trained machine learning model or is performed by another machine learning model based on the at least one of the user gameplay feedback or the levels of activity of the user input data or the game state data.

28. The system of claim 25, wherein the user gameplay feedback is obtained contemporaneously with the recorded gameplay and includes one or more of audible feedback, visual feedback, textual feedback, motion feedback, and vital signs feedback.

* * * * *